US012808122B2

(12) United States Patent
Mochiduki et al.

(10) Patent No.: US 12,808,122 B2
(45) Date of Patent: Nov. 24, 2026

(54) DISPERSION, COMPOSITE, AND PRODUCING METHODS THEREOF

(71) Applicant: Yokogawa Electric Corporation, Tokyo (JP)

(72) Inventors: Makoto Mochiduki, Tokyo (JP); Takahiro Sako, Tokyo (JP); Hiroaki Tanaka, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 400 days.

(21) Appl. No.: 18/284,306

(22) PCT Filed: Mar. 23, 2022

(86) PCT No.: PCT/JP2022/013379
§ 371 (c)(1),
(2) Date: Nov. 1, 2023

(87) PCT Pub. No.: WO2022/210141
PCT Pub. Date: Oct. 6, 2022

(65) Prior Publication Data

US 2024/0183107 A1 Jun. 6, 2024

(30) Foreign Application Priority Data

Mar. 31, 2021 (JP) ................................ 2021-059274

(51) Int. Cl.
*D21H 17/27* (2006.01)
*C08B 5/14* (2006.01)
(Continued)

(52) U.S. Cl.
CPC ............... *D21H 17/27* (2013.01); *C08B 5/14* (2013.01); *C08B 15/02* (2013.01); *D21C 9/005* (2013.01); *D21H 13/02* (2013.01); *D21H 27/30* (2013.01)

(58) Field of Classification Search
CPC .......... D21H 17/27; C08B 15/02; C08B 5/14; D21C 9/001–008
See application file for complete search history.

(56) References Cited

U.S. PATENT DOCUMENTS

2011/0281487 A1 11/2011 Mukai et al.
2019/0367638 A1 12/2019 Lin et al.
(Continued)

FOREIGN PATENT DOCUMENTS

CA 3049855 A1 * 7/2018 ............... C08B 7/00
CA 3118351 A1 * 5/2020 ............. D21B 1/023
(Continued)

OTHER PUBLICATIONS

English Machine Translation KR 20220116911 A, 2022. (Year: 2022).*
(Continued)

*Primary Examiner* — Anthony Calandra
(74) *Attorney, Agent, or Firm* — RANKIN, HILL & CLARK LLP

(57) ABSTRACT

A dispersion of a cellulose nanofiber (CNF) and a cellulose nanocrystal (CNC) that maintains a physical property even after drying and redispersing and has a long pot life is provided. A composite of the CNF and the CNC having a higher rupture strength and a higher oxygen gas barrier property is also provided. The dispersion contains a CNF having a sulfate ester group and a CNC having a sulfate ester group. The composite contains the CNF having a sulfate ester group and the CNC having a sulfate ester group.

2 Claims, 13 Drawing Sheets

(51) Int. Cl.

| | |
|---|---|
| ***C08B 15/02*** | (2006.01) |
| ***D21C 9/00*** | (2006.01) |
| ***D21H 13/02*** | (2006.01) |
| ***D21H 27/30*** | (2006.01) |

(56) References Cited

U.S. PATENT DOCUMENTS

| | | | |
|---|---|---|---|
| 2021/0332154 | A1 | 10/2021 | Nagahama et al. |
| 2021/0395495 | A1 | 12/2021 | Kinoshita et al. |
| 2022/0162345 | A1 | 5/2022 | Nagahama et al. |

FOREIGN PATENT DOCUMENTS

| | | | | | |
|---|---|---|---|---|---|
| CN | 110446722 | A | | 11/2019 | |
| EP | 3569621 | A1 | | 11/2019 | |
| JP | 2020041255 | A | | 3/2020 | |
| JP | 2025021935 | A | * | 2/2025 | |
| KR | 20190092876 | A | | 8/2019 | |
| KR | 20220116911 | A | * | 8/2022 | ................ C08L 1/10 |
| WO | 2010074340 | A1 | | 7/2010 | |
| WO | WO-2016187362 | A1 | * | 11/2016 | ........... C04B 14/368 |
| WO | 2018012629 | A1 | | 1/2018 | |
| WO | 2018131721 | A1 | | 7/2018 | |
| WO | 2020059525 | A1 | | 3/2020 | |
| WO | 2020085090 | A1 | | 4/2020 | |
| WO | 2020196175 | A1 | | 10/2020 | |
| WO | WO-2020218152 | A1 | * | 10/2020 | ............... C08B 5/14 |

OTHER PUBLICATIONS

Chinese Office Action dated Jul. 12, 2025 issued for Chinese Patent Application No. 202280026827.2 and its English machine translation.

International Search Report (ISR) dated Jun. 14, 2022 filed in PCT/JP2022/013379.

Raphael Bardet et al., "Substitution of nanoclay in high gas barrier films of cellulose nanofibrils with cellulose hanocrystals and thermal treatment", Cellulose, 2015, 22, pp. 1227-1241.

Kiuxuan Sun et al., "Nanocellulose films with combined cellulose nanofibers and nanocrystals: tailored thermal, optical and mechanical properties", Cellulose, 2018, 25, pp. 1103-1115.

Pedro Claro et al., "Curaua and eucalyptus nanofiber films by continuous casting: mixture of cellulose nanocrystals and nanofibrils", Cellulose, 2019, 26, pp. 2453-2470.

Tyagi, P. et al., "Carbohydrate Polymers", 2019, vol. 206, pp. 281-288.

Japanese Office Action (JPOA) mailed on May 30, 2023 issued in Japanese patent application No. 2023-511046.

Extended European search report dated Mar. 5, 2025 for European Patent Application No. 22780356.6.

Chinese Office Action (CNOA) dated Mar. 10, 2026 for Chinese Patent Application No. 202280026827.2; English machine translation.

* cited by examiner

DISPERSION, COMPOSITE, AND PRODUCING METHODS THEREOF

TECHNICAL FIELD

The present disclosure relates to a dispersion and a composite, and producing methods thereof.

BACKGROUND ART

Due to growing environmental awareness, studies for the practical applications of biomass-derived materials have been conducted around the world. A cellulose nanofiber (hereinafter also referred to as "CNF" as appropriate) obtained by fibrillating a cellulose fiber derived from a wooden material (for example, a wood chip) to nanosize, and a cellulose nanocrystal (hereinafter also referred to as "CNC" as appropriate) obtained by hydrolyzing an amorphous part of a cellulose fiber with an acid have been attracting attention as environmentally compatible novel materials. For example, Patent Literature 1 discloses a sulfate-esterified CNF and a producing method thereof, and Non Patent Literatures 1 to 3 describe composite films containing CNF and CNC.

CITATION LIST

Patent Literature

Patent Literature 1: JP 2020-41255 A

Non Patent Literature

Non Patent Literature 1: Raphael Bardet et al., "Substitution of nanoclay in high gas barrier films of cellulose nanofibrils with cellulose nanocrystals and thermal treatment," Cellulose 2015, 22, 1227-1241
Non Patent Literature 2: Xiuxuan Sun et al., "Nanocellulose films with combined cellulose nanofibers and nanocrystals: tailored thermal, optical and mechanical properties," Cellulose 2018, 25, 1103-1115
Non Patent Literature 3: Pedro Claro et al., "Curaua and eucalyptus nanofiber films by continuous casting: mixture of cellulose nanocrystals and nanofibrils," Cellulose 2019, 26, 2453-2470

SUMMARY

Technical Problem

The composites containing CNF and CNC as described in Non Patent Literatures 1 to 3 are produced by applying and/or filtrating a dispersion containing CNF and CNC and drying the resultant. From the aspect of reducing the production cost of the composite, it is advantageous that a dispersion is dried to remove a dispersion medium and obtain a dried body, the dried body is transported and/or stored, after which a dispersion medium is added to the dried body to obtain a dispersion again, and then the dispersion is used to produce the composite. Therefore, the dispersion preferably has a physical property (specifically, viscosity) that changes little even after drying and redispersing. The dispersion preferably has a long pot life (usable time). Furthermore, the composite containing CNF and CNC is required to have a higher rupture strength and a higher oxygen gas barrier property when used as a packaging material or a container material.

Therefore, the present disclosure provides a dispersion of CNF and CNC that maintains its physical property even after drying and redispersing and has a long pot life. Additionally, the present disclosure provides a composite of CNF and CNC having a higher rupture strength and a higher oxygen gas barrier property. Furthermore, the present disclosure provides methods for producing the dispersion and the composite.

Solution to Problem

According to one aspect of the present disclosure, a dispersion comprising a cellulose nanofiber having a sulfate ester group and a cellulose nanocrystal having a sulfate ester group is provided.

According to one aspect of the present disclosure, a composite comprising a cellulose nanofiber having a sulfate ester group and a cellulose nanocrystal having a sulfate ester group is provided.

According to one aspect of the present disclosure, a method for preparing the dispersion as defined in the above-described aspect is provided. The method comprises mixing a dispersion of a cellulose nanofiber having a sulfate ester group with a dispersion of a cellulose nanocrystal having a sulfate ester group while applying a shear force.

According to one aspect of the present disclosure, a method for producing the composite as defined in the above-described aspect is provided. The method comprises: (a) forming a first layer containing a liquid and one of a cellulose nanofiber having a sulfate ester group or a cellulose nanocrystal having a sulfate ester group; (b) forming a second layer on the first layer by supplying a dispersion containing another of the cellulose nanofiber having a sulfate ester group or the cellulose nanocrystal having a sulfate ester group on the first layer; and (c) removing the liquid from the first layer and the second layer.

The present application claims the benefit of priority to Japanese Patent Application No. 2021-059274, the contents of which are incorporated herein by reference.

Advantageous Effects

The dispersion of the present disclosure maintains the physical property even after drying and redispersing and has a long pot life. Additionally, the composite of the present disclosure has the higher rupture strength and the higher oxygen gas barrier property.

DESCRIPTION OF EMBODIMENTS

Figure 1:
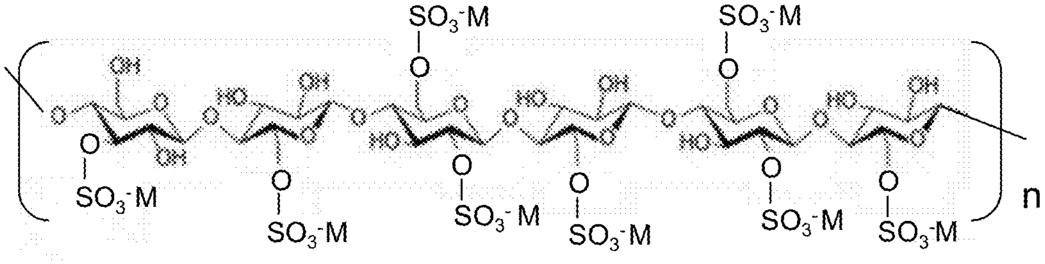
FIG. 1 is a drawing illustrating an example of sulfate-esterified CNF.

The following describes embodiments with reference to the drawings as appropriate. The present disclosure is not limited to the following embodiments, and can be subjected to various kinds of changes in design without departing from the scope of the claims. For convenience of explanation, dimensional ratios and shapes of respective parts in the drawings may be exaggerated, and different from actual dimensional ratios and shapes in some cases. A numerical range expressed herein using the term "to" includes respective values described before and after the term "to" as a lower limit value and an upper limit value.

(1) Dispersion

A dispersion (dispersion liquid) according to the embodiment contains a CNF having a sulfate ester group (also referred to as a sulfate-esterified CNF) and a CNC having a sulfate ester group (also referred to as a sulfate-esterified CNC) as dispersoids (dispersed material).

The CNF is a fiber containing cellulose. Cellulose is a polysaccharide in which glucose is bonded by a β-1,4 glycosidic bond, and is represented by $(C_6H_{10}O_5)_n$. The CNF generally has a fiber width (fiber diameter (diameter of a circle of equivalent projection area)) in a range of 4 nm to 100 nm, and a fiber length in a range of 0.5 μm to 100 μm. The fiber width and the fiber length can be determined by, for example, measuring fiber widths and fiber lengths of randomly selected 50 CNFs using an atomic force microscope (SPM-9700HT, manufactured by Shimadzu Corporation) and calculating the respective arithmetic means.

The CNC is a needle-shaped crystal containing cellulose. The CNC generally has a short axis with a length in a range of 4 nm to 100 nm, and a long axis with a length of more than or equal to 50 nm and less than 0.5 μm. The lengths of the short axis and the long axis can be determined by, for example, measuring the lengths of the long axis and the short axis of randomly selected 50 CNCs using an atomic force microscope (SPM-9700HT, manufactured by Shimadzu Corporation) and calculating the respective arithmetic means.

The sulfate-esterified CNF is a CNF containing cellulose having at least one OH group substituted with a sulfate ester group. Similarly, the sulfate-esterified CNC is a CNC containing cellulose having at least one OH group substituted with a sulfate ester group. Here, the sulfate ester group may be a sulfate ester group represented by a formula (1):

[Chem. 1]

(1)

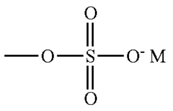

wherein M represents a monovalent to trivalent cation. When M is a divalent or trivalent cation, M is ionically bonded to two or three $—OSO_3^-$.

Examples of the monovalent to trivalent cation include a hydrogen ion, a metal ion, and an ammonium ion. Examples of the metal ion include an alkali metal ion, an alkaline earth metal ion, a transition metal ion, and other metal ions. Examples of the alkali metal include lithium, sodium, potassium, rubidium, and cesium. Examples of the alkaline earth metal include calcium and strontium. Examples of the transition metal include iron, nickel, palladium, copper, and silver. Examples of the other metal include beryllium, magnesium, zinc, aluminum. Examples of the ammonium ion include $NH_4^+$ as well as ammonium ions derived from various kinds of amine in which one or more hydrogen atoms of $NH_4^+$ is substituted with an organic group (e.g. quaternary ammonium cation, alkanolamine ion, and pyridinium ion). The cation may be any one of the listed cations or a combination of two or more of the listed cations.

Figure 2:
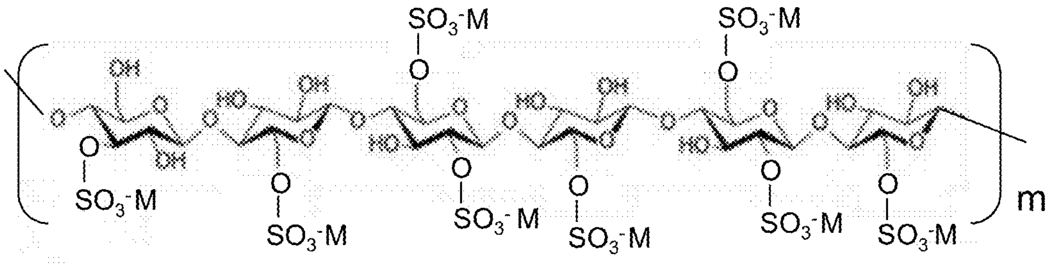
FIG. 2 is a drawing illustrating an example of sulfate-esterified CNC.

Examples of the sulfate-esterified CNF and the sulfate-esterified CNC are illustrated in FIG. 1 and FIG. 2, respectively.

Since the sulfate-esterified CNF and the sulfate-esterified CNC both have the sulfate ester groups on their surfaces, they strongly electrostatically repel each other. Therefore, a dispersion according to the embodiment is excellent in easy dispersibility and dispersion stability. The sulfate-esterified CNF and the sulfate-esterified CNC have high affinities for one another because they have similar surface conditions. Therefore, in the dispersion according to the embodiment, the sulfate-esterified CNF and the sulfate-esterified CNC are uniformly mixed, and microphase-separation into a CNF-rich phase and a CNC-rich phase is less likely to occur. Because of these causes, the dispersion according to the embodiment maintains the physical property even after drying and redispersing, and has a long pot life. Furthermore, the dispersion according to the embodiment can be used to produce a composite containing the CNF and the CNC mixed uniformly, and the composite produced can have a high rupture strength and a high oxygen gas barrier property.

At least one of the sulfate-esterified CNF or the sulfate-esterified CNC may have another substituent in addition to the sulfate ester group. The other substituent may substitute at least one of the OH groups in the cellulose constituting the CNF or the CNC. The other substituent may be, for example, an anionic substituent and its salt, an ester group, an ether group, an acyl group, an aldehyde group, an alkyl group, an alkylene group, or an aryl group, or may include two or more thereof. From the aspect of improving the dispersibility, the other substituent may be an anionic substituent or its salt, or an acyl group. Examples of the anionic substituent include a carboxy group, a phosphate ester group, a phosphite ester group, and a xanthate group. From the aspect of improving the dispersibility, the salt of the anionic substituent may be sodium salt, potassium salt, or calcium salt. From the aspect of improving the dispersibility, the acyl group may be an acetyl group.

A sulfate esterification modification proportion in the sulfate-esterified CNF can be set to any appropriate value depending on the usage and the like. The sulfate esterification modification proportion in the sulfate-esterified CNF can be indicated by a sulfur content (mass %) in the sulfate-esterified CNF. The sulfur content (mass %) in the sulfate-esterified CNF is generally 0.05 mass % to 30 mass %, preferably 0.1 weight % to 25 weight %, and more preferably 0.5 weight % to 22 weight %, but not limited thereto. The sulfate-esterified CNF with the sulfur content of 30 weight % or less can have a sufficient crystallinity and a sufficient heat resistance. The sulfate-esterified CNF with the sulfur content of 0.05 weight % or more can be efficiently produced. This is because the CNFs electrostatically repel to one another due to the sufficient amount of the sulfate ester groups, and this reduces an energy necessary for obtaining the sulfate-esterified CNF by fibrillating a sulfate-esterified pulp in the production process as described later.

The sulfate esterification modification proportion in the sulfate-esterified CNC can be set to any appropriate value depending on the usage and the like. The sulfate esterification modification proportion in the sulfate-esterified CNC can be indicated by a sulfur content (mass %) in the sulfate-esterified CNC, and generally in a range of 0.05 mass % to 15 mass %, although not limited thereto.

The sulfur contents (mass %) in the sulfate-esterified CNF and the sulfate-esterified CNC can be determined as follows, for example, by a combustion absorption-ion chromatography (IC) method.

Measurement apparatus: ICS-1500 manufactured by Nippon Dionex K.K.

Measurement conditions: A sample is weighed in a magnetic board and combusted in an oxygen atmosphere (flow rate: 1.5 L/min) in a ring furnace (1350° C.), producing a gaseous component. Three percent hydrogen peroxide water (20 ml) is caused to absorb the gaseous component to provide an absorption liquid. The absorption liquid is diluted with pure water to obtain 100 ml of a diluted liquid, and the diluted liquid is subjected to ion chromatography. A measurement results are used to calculate a sulfate ion concentration (mass %) of the sample, and the sulfur content is calculated by a formula below.

$$\text{sulfur content (mass \%)}=\text{sulfate ion concentration (mass \%)}\times 32/96$$

The sulfate-esterified CNF can be produced by, for example, sulfate-esterifying a raw pulp to obtain a sulfate-esterified pulp, and fibrillating the sulfate-esterified pulp as described later. Thus obtained sulfate-esterified CNF has a crystalline part and an amorphous part. The crystallinity of the sulfate-esterified CNF depends on its raw material (cotton, wood, and the like). The sulfate-esterified CNF generally has the crystallinity of 20% to 99%, preferably 30% to 95%, more preferably 40% to 90%, and further preferably 50% to 85%. The sulfate-esterified CNF with the crystallinity of 20% or more can have a sufficient heat resistance and a sufficient rigidity. For the sulfate-esterified CNF with the crystallinity of exceeding 99%, production of the sulfate-esterified CNF having a sufficient fiber length tends to be difficult.

The sulfate-esterified CNC can be obtained by hydrolyzing the amorphous part of the raw pulp with sulfuric acid. The sulfate-esterified CNC generally has a crystallinity of 85% to 100%, in particular, 90% or more.

The crystallinities of the sulfate-esterified CNF and the sulfate-esterified CNC can be determined by dividing an area of a peak derived from crystalline cellulose by a sum of an area of halo derived from amorphous cellulose and the area of the peak derived from crystalline cellulose in an X-ray diffraction pattern.

A mass ratio of the sulfate-esterified CNF to the sulfate-esterified CNC contained in the dispersion according to the embodiment may be in a range of 1:99 to 99:1. This allows further improvement in the rupture strength and the oxygen gas barrier property of the composite produced using the dispersion, as indicated in the examples described below.

The dispersion according to the embodiment further contains a dispersion medium. The dispersion medium may be a polar medium such as water, dimethylsulfoxide, dimethylformamide, ethylene glycol, diethyl ether, dioxane, tetrahydrofuran, methyltetrahydrofuran, or a mixture thereof. Especially, the dispersion medium may contain a liquid having a relative permittivity of 38 or more in an amount of 50 to 100 volume %, preferably 75 to 100 volume %, based on the total volume of the dispersion medium. Especially, the dispersion medium may contain a liquid having a relative permittivity of 38 or more in an amount of 80 to 100 volume % based on the total volume of the dispersion medium. This allows the pot life of the dispersion to be further extended as indicated in the examples described below.

The dispersion according to the embodiment may optionally further contain an additive as a dispersoid. The additive may be an inorganic additive or an organic additive.

The inorganic additive may be inorganic particles, such as particles of silica, mica, talc, clay, carbon, carbonate (for example, calcium carbonate, magnesium carbonate), oxide (for example, aluminum oxide, titanium oxide, zinc oxide, iron oxide), ceramic (for example, ferrite), or a mixture thereof. The inorganic particles may be contained in an amount of 0.09 to 5 mass % based on the total weight of the dispersoid. This allows further improvement in the rupture strength of the composite produced using the dispersion, as indicated in the examples described below.

Examples of the organic additive include organic particles and a functional compound. Examples of the organic particles include particles of at least one substance selected from the group consisting of resins and rubbers, for example, particles of phenolic resin, melamine resin, urea resin, alkyd resin, epoxy resin, unsaturated polyester resin, polyurethane resin, polyethylene resin (for example, high-density polyethylene, medium-density polyethylene, and low-density polyethylene), polypropylene resin, polystyrene resin, acrylic resin, polyvinyl alcohol, acrylamide resin, silicone resin, natural rubber, synthetic rubber, and a mixture thereof. Examples of the functional compound include pigment, UV absorber, antioxidant, antistatic agent, and surfactant.

The dispersion according to the embodiment can be dried by any method, such as freeze drying and spray drying, as necessary. By adding a dispersion medium to a dried body and mixing them, the dispersion can be obtained again.

(2) Method for Preparing Dispersion

An example of a method for preparing the dispersion containing the sulfate-esterified CNF and the sulfate-esterified CNC as described above will be described. The method for preparing the dispersion containing the sulfate-esterified CNF and the sulfate-esterified CNC according to the embodiment includes mixing a sulfate-esterified CNF dispersion and a sulfate-esterified CNC dispersion.

The sulfate-esterified CNF dispersion may be prepared by any method. For example, a solution containing dimethylsulfoxide, sulfuric acid, and at least one of acetic anhydride or propionic acid anhydride is mixed with a raw pulp, thereby obtaining a sulfate-esterified pulp. Subsequently, the sulfate-esterified pulp is combined with the above-described dispersion medium and mixed together. The mixing may be performed by, for example, an ultrasonication. Thus, the sulfate-esterified pulp is fibrillated, and the sulfate-esterified CNF dispersion is obtained.

The sulfate-esterified CNC dispersion may be prepared by any method. For example, the amorphous part of cellulose in the raw pulp is hydrolyzed with sulfuric acid, and the resulting solid is washed, and then combined with an appropriate dispersion medium and mixed together, and thus the sulfate-esterified CNC dispersion can be obtained.

The sulfate-esterified CNF dispersion is mixed with the sulfate-esterified CNC dispersion. The above-described additive may be further added here. The mixing may be performed while a shear force is applied. This allows satisfactory mixing of the sulfate-esterified CNF and the sulfate-esterified CNC. The composite produced using the satisfactorily mixed dispersion can have further higher rupture strength and oxygen gas barrier property as indicated in the examples described below. For the mixing, an apparatus, such as stirrer, three-roll machine, twin screw kneader, triaxial planetary kneader, disperser, paint shaker, bead mill, cutter mixer, or planetary mixer, may be used.

The mixing may be performed under any condition, and for example, the mixing may be performed at 20° C. to 150° C. for five minutes to one hour.

(3) Composite

Figure 3:
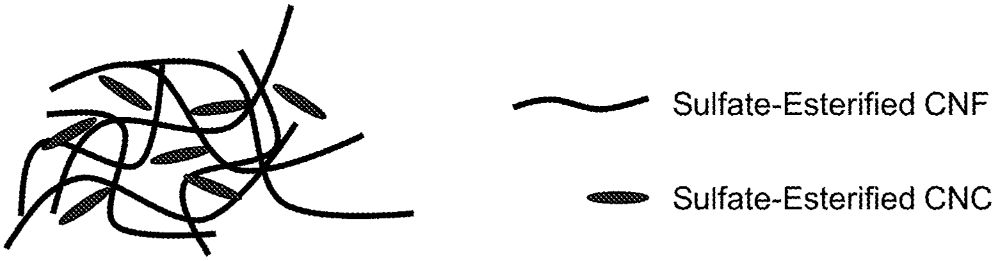
FIG. 3 is a drawing schematically illustrating a composite according to one embodiment.
Figure 4:
FIG. 4 is a drawing schematically illustrating the composite according to one embodiment.

The composite according to the embodiment contains the sulfate-esterified CNF and the sulfate-esterified CNC. In one embodiment, as schematically illustrated in FIG. 3, the composite is a mixed composite in which the sulfate-esterified CNF and the sulfate-esterified CNC are mixed. In another embodiment, as schematically illustrated in FIG. 4, the composite is a layered composite including at least one CNF layer containing the sulfate-esterified CNF and at least one CNC layer containing the sulfate-esterified CNC. The following describes respective embodiments.

(3-1) Mixed Composite

Since the sulfate-esterified CNF and the sulfate-esterified CNC are described above in detail, detailed descriptions of them are omitted here. The sulfate-esterified CNF and the sulfate-esterified CNC have high affinities for one another because they both have the sulfate ester groups on their surfaces and have similar surface conditions. This allows the sulfate-esterified CNF and the sulfate-esterified CNC in the mixed composite to be in a uniformly mixed state without being separated into phases, which leads to a high rupture strength and a high oxygen gas barrier property of the mixed composite.

A mass ratio of the sulfate-esterified CNF to the sulfate-esterified CNC contained in the mixed composite may be in a range of 1:99 to 99:1. This allows further improvement in the rupture strength and the oxygen gas barrier property of the mixed composite, as indicated in the examples described below.

The mixed composite may further contain an additive mixed with the sulfate-esterified CNF and the sulfate-esterified CNC. The additive may be an inorganic additive or an organic additive.

Figure 5:
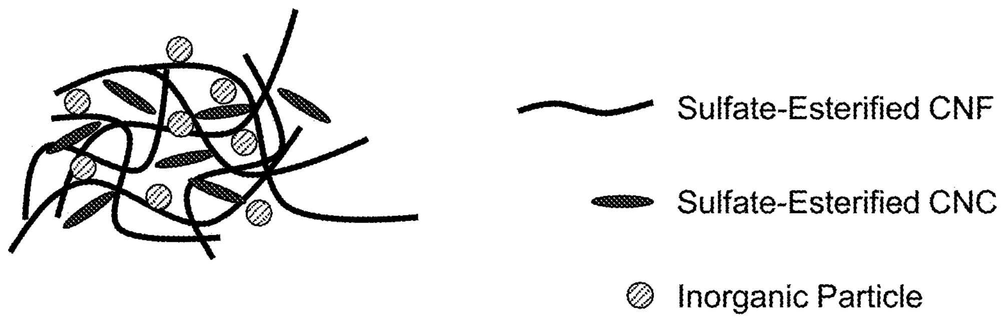
FIG. 5 is a drawing schematically illustrating the composite according to one embodiment.

As illustrated in FIG. 5, the mixed composite may contain inorganic particles as the inorganic additive. Examples of the inorganic particles include particles of silica, mica, talc, clay, carbon, carbonate (for example, calcium carbonate, magnesium carbonate), oxide (for example, aluminum oxide, titanium oxide, zinc oxide, iron oxide), ceramic (for example, ferrite), or a mixture thereof. The mixed composite may contain the inorganic particles in an amount of 0.09 to 5 mass % based on the total mass of the mixed composite. This allows further improvement in the rupture strength of the mixed composite.

Figure 6:
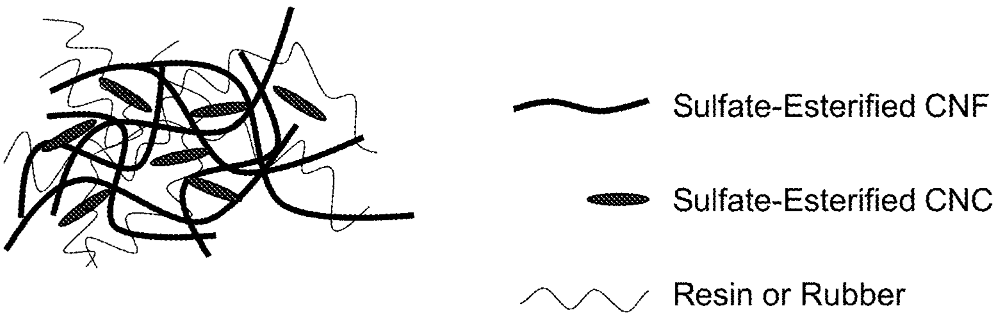
FIG. 6 is a drawing schematically illustrating the composite according to one embodiment.

As illustrated in FIG. 6, the mixed composite may contain at least one substance selected from the group consisting of resins and rubbers as the organic additive. Examples of the resin and the rubber include phenolic resin, melamine resin, urea resin, alkyd resin, epoxy resin, unsaturated polyester resin, polyurethane resin, polyethylene resin (for example, high-density polyethylene, medium-density polyethylene, and low-density polyethylene), polypropylene resin, polystyrene resin, acrylic resin, polyvinyl alcohol, acrylamide resin, silicone resin, natural rubber, and synthetic rubber. The at least one substance selected from the group consisting of resins and rubbers allows further improvement in the rupture strength of the mixed composite. Additionally or alternatively, the mixed composite may contain a functional compound as the organic additive. Examples of the functional compound include pigment, UV absorber, antioxidant, antistatic agent, and surfactant.

Figure 7:
FIG. 7 is a drawing schematically illustrating the composite according to one embodiment.
Figure 8:
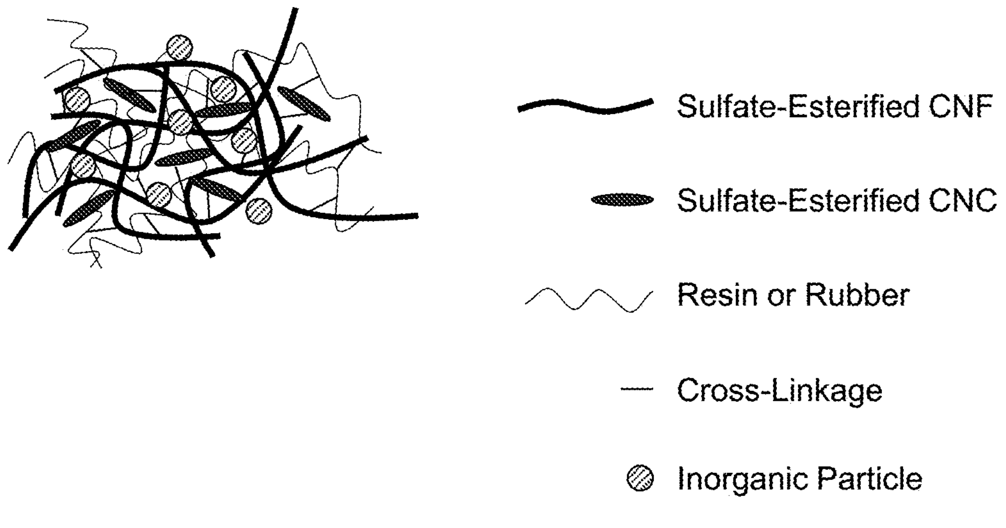
FIG. 8 is a drawing schematically illustrating the composite according to one embodiment.

As illustrated in FIG. 7, the mixed composite may have a crosslinked structure. Specifically, a cross-linkage may be formed between at least one of the sulfate-esterified CNFs and at least one of the sulfate-esterified CNFs, the sulfate-esterified CNCs, or the at least one substance selected from the group consisting of resins and rubbers. Additionally or alternatively, a cross-linkage may be formed between at least one of the sulfate-esterified CNCs and at least one of the sulfate-esterified CNFs, the sulfate-esterified CNCs, or the at least one substance selected from the group consisting of resins and rubbers. The cross-linkage can be formed by a condensation reaction or an addition reaction to bond a hydroxy group of the cellulose to another hydroxy group of the cellulose or to a reactive moiety (for example, hydroxy group, aldehyde group, carboxy group, methoxy group, carbonyl group, alkene moiety, and ether moiety) of the at least one substance selected from the group consisting of resins and rubbers. While the type of the bond is not specifically limited, examples of the bond include a urethane bond, an ester bond, an ether bond, an amide bond, and a urea bond. In particular, the cross-linkage including the urethane bond can improve the oxygen gas barrier property of the mixed composite. As illustrated in FIG. 8, the mixed composite with the crosslinked structure may contain the above-described inorganic particles.

The presence of the cross-linkage can be confirmed by any method, such as infrared spectroscopy method, near-infrared spectroscopy method, Raman spectroscopy method, nuclear magnetic resonance spectroscopy method, elementary analysis, gel permeation chromatography, or differential scanning calorimetry. The type of the chemical bond forming the cross-linkage can be identified by any method, such as infrared spectroscopy method, near-infrared spectroscopy method, Raman spectroscopy method, or nuclear magnetic resonance spectroscopy method.

Figure 9:
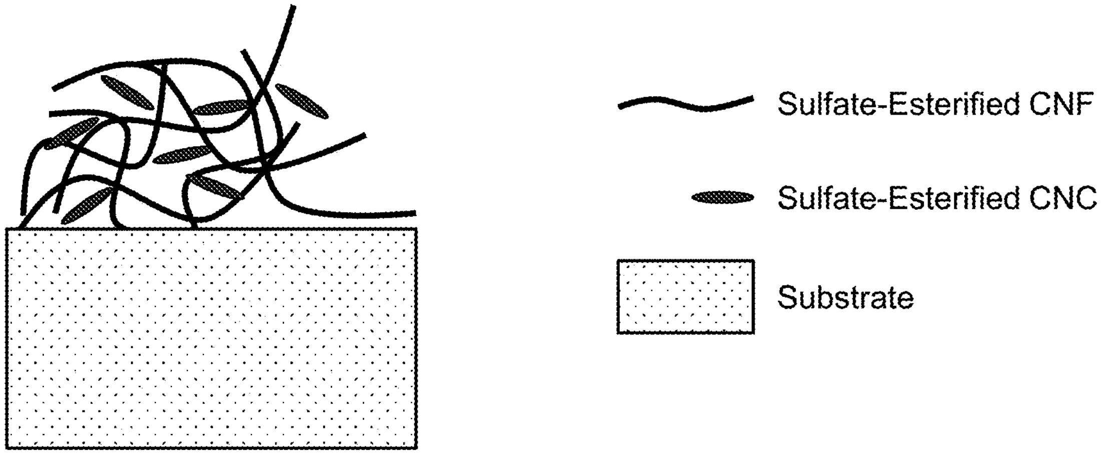
FIG. 9 is a drawing schematically illustrating the composite according to one embodiment.

As illustrated in FIG. 9, the mixed composite may be supported on a substrate. In other words, a composite according to one embodiment may include the above-described mixed composite containing the sulfate-esterified CNF and the sulfate-esterified CNC, and a substrate supporting the mixed composite. The substrate may be a paper substrate containing cellulose as a main component, such as filter paper, western paper, Japanese paper, pulp sheet, kraft paper, or cardboard base paper. The paper substrate may contain inorganic particles such as talc, a fluorescent agent, a resin such as polyethylene, and the like.

Cellulose as the main component of the paper substrate has an OH group forming a considerably strong hydrogen bond with the sulfate ester group. Therefore, the mixed composite containing the sulfate-esterified CNF and the sulfate-esterified CNC can be adhered to the paper substrate with a sufficient strength. Additionally, the composite including the paper substrate and the mixed composite supported on the paper substrate can have a higher gas barrier property and a higher rupture strength than those of a single body of the paper substrate. Accordingly, the composite can be used as a substitute, having the improved function, for a paper product, such as a packaging material, a packing material (for example, cardboard), or a container material.

(3-2) Layered Composite

Figure 10:
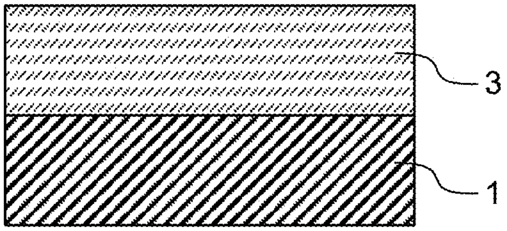
FIG. 10 is a drawing schematically illustrating the composite according to one embodiment.
Figure 11:
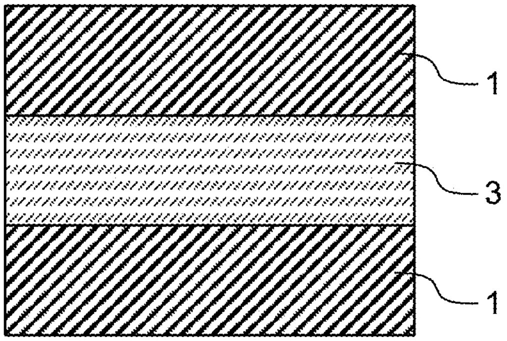
FIG. 11 is a drawing schematically illustrating the composite according to one embodiment.
Figure 12:
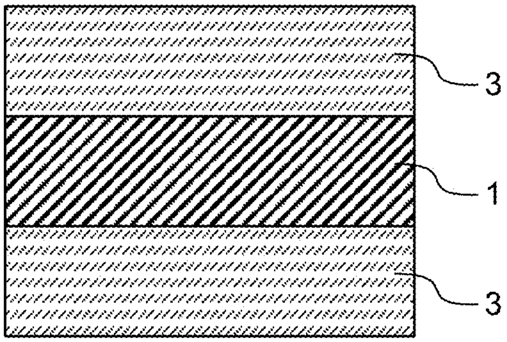
FIG. 12 is a drawing schematically illustrating the composite according to one embodiment.

In the layered composite, at least one CNF layer and at least one CNC layer are adjacent to one another. At least one CNF layer and at least one CNC layer may be alternately layered. For example, in one embodiment, as illustrated in FIG. 10, the layered composite includes one CNF layer 1 and one CNC layer 3 disposed on the CNF layer 1. In another embodiment, as illustrated in FIG. 11, the layered composite includes two CNF layers 1 and one CNC layer 3 disposed between the CNF layers 1. In still another embodiment, as illustrated in FIG. 12, the layered composite includes two CNC layers 3 and one CNF layer 1 disposed between the CNC layers 3.

Since the sulfate-esterified CNF and the sulfate-esterified CNC are described above in detail, detailed descriptions of them are omitted here. The sulfate-esterified CNF and the sulfate-esterified CNC have high affinities for one another because they both have the sulfate ester groups on their surfaces and have the similar surface conditions. This allows the CNF layer and the CNC layer adhere to each other with high adhesive strength, which leads to a high rupture strength and the high oxygen gas barrier property of the mixed composite.

At least one layer of the CNF layer(s) or the CNC layer(s) may further contain an additive. The additive may be an inorganic additive or an organic additive described above. At least one layer of the CNF layer(s) or the CNC layer(s) may contain inorganic particles in an amount of 0.09 to 5 mass % based on the total mass of the layer. This allows further improvement in the rupture strength of the layered composite. An interface between an inorganic particle-containing layer and a layer adjacent to the inorganic particle-containing layer is uneven due to the presence of the inorganic particles, which provides an anchoring effect that further increases the adhesive strength between the adjacent layers.

At least one layer of the CNF layer(s) or the CNC layer(s) may further contain at least one substance selected from the group consisting of resins and rubbers. This allows further improvement in the rupture strength of the layered composite. Examples of the resin and the rubber include phenolic resin, melamine resin, urea resin, alkyd resin, epoxy resin, unsaturated polyester resin, polyurethane resin, polyethylene resin (for example, high-density polyethylene, medium-density polyethylene, and low-density polyethylene), polypropylene resin, polystyrene resin, acrylic resin, polyvinyl alcohol, acrylamide resin, silicone resin, natural rubber, and synthetic rubber.

At least one layer of the CNF layer(s) or the CNC layer(s) may have a crosslinked structure. In the CNF layer, a cross-linkage may be formed between at least one of the sulfate-esterified CNFs and at least one of the sulfate-esterified CNFs or the at least one substance selected from the group consisting of resins and rubbers. Additionally or alternatively, in the CNC layer, a cross-linkage may be formed between at least one of the sulfate-esterified CNCs and at least one of the sulfate-esterified CNCs or the at least one substance selected from the group consisting of resins and rubbers. The cross-linkage can be formed by a condensation reaction or an addition reaction to bond a hydroxy group of the cellulose to another hydroxy group of the cellulose or a reactive moiety (for example, hydroxy group, aldehyde group, carboxy group, methoxy group, carbonyl group, alkene moiety, and ether moiety) of the at least one substance selected from the group consisting of resins and rubbers. While the type of the bond is not specifically limited, examples of the bond include a urethane bond, an ester bond, an ether bond, an amide bond, and a urea bond. In particular, the cross-linkage structure including the urethane bond can improve the oxygen gas barrier property of the layered composite.

The presence of the cross-linkage can be confirmed by any method, such as infrared spectroscopy method, near-infrared spectroscopy method, Raman spectroscopy method, nuclear magnetic resonance spectroscopy method, elementary analysis, gel permeation chromatography, or differential scanning calorimetry. The type of the chemical bond forming the cross-linkage can be identified by any method, such as infrared spectroscopy method, near-infrared spectroscopy method, Raman spectroscopy method, or nuclear magnetic resonance spectroscopy method.

Figure 13:
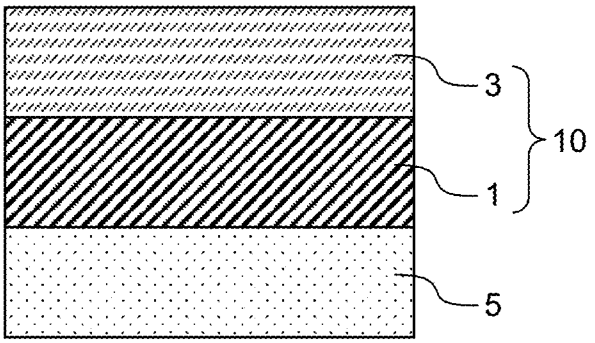
FIG. 13 is a drawing schematically illustrating the composite according to one embodiment.

The layered composite may be supported on a substrate. In other words, as illustrated in FIG. 13, a composite according to one embodiment may include a layered composite 10 including at least one CNF layer 1 and at least one CNC layer 3, and a substrate 5 that supports the layered composite 10. The substrate 5 may be a paper substrate containing cellulose as a main component, such as filter paper, western paper, Japanese paper, pulp sheet, kraft paper, or cardboard base paper. The paper substrate may contain inorganic particles such as talc, a fluorescent agent, a resin such as polyethylene, and the like.

Cellulose as the main component of the paper substrate has an OH group forming a considerably strong hydrogen bond with the sulfate ester groups of the sulfate-esterified CNF and/or the sulfate-esterified CNC. Therefore, the layered composite can be adhered to the paper substrate with a sufficient strength. Additionally, the composite including the paper substrate and the layered composite supported on the paper substrate can have a higher gas barrier property and a higher rupture strength than those of a single body of the paper substrate. Accordingly, the composite can be used as a substitute, having the improved function, for a paper product, such as a packaging material, a packing material (for example, cardboard), or a container material.

(4) Method for Producing Composite (4-1) Method for Producing Mixed Composite

The above-described mixed composite can be produced by drying the above-described dispersion containing the sulfate-esterified CNF and the sulfate-esterified CNC to remove the dispersion medium.

When the mixed composite contains the at least one substance selected from the group consisting of resins and rubbers, the mixed composite can be produced by drying a dispersion further containing particles of the at least one substance selected from the group consisting of resins and rubbers. During the drying, the dispersion may be heated and/or pressed. A dried body after the drying may be heated and/or pressed. Alternatively, the mixed composite containing the at least one substance selected from the group consisting of resins and rubbers can be produced also by drying the dispersion containing the sulfate-esterified CNF and the sulfate-esterified CNC to obtain a mixed powder of the sulfate-esterified CNF and the sulfate-esterified CNC, adding the at least one substance selected from the group consisting of resins and rubbers to the mixed powder and mixing them, and heating and/or pressing the mixture.

When the mixed composite has the crosslinked structure, the mixed composite can be produced by adding a cross-linking agent to the above-described dispersion containing the sulfate-esterified CNF and the sulfate-esterified CNC to cause a cross-linking reaction, and subsequently drying the dispersion.

The mixed composite may be formed into any desired shape depending on the usage.

The dispersion may be dried on the above-described substrate, especially the paper substrate, thereby producing a composite including a mixed composite and the substrate supporting the mixed composite. Since the dispersion on the paper substrate can be quickly dried, the composite can be produced in a short time.

(4-2) Method for Producing Layered Composite

An example of a method for producing the above-described layered composite will be described. The method for producing the layered composite includes: (a) forming a first layer containing a liquid and one of a sulfate-esterified CNF or a sulfate-esterified CNC; (b) forming a second layer on the first layer by supplying a dispersion containing the other of the sulfate-esterified CNF or the sulfate-esterified CNC on the first layer; and (c) removing the liquid from the first layer and the second layer.

In the step (a), a layer of a dispersion containing one of the sulfate-esterified CNF or the sulfate-esterified CNC is formed, thus forming a first layer. A liquid content in the first layer may be more than 0 mass %, and especially may be 5 mass % or more. This allows improvement in the adhesiveness between the first layer and the second layer formed on the first layer, as indicated in the examples described below. This would be due to the presence of a layer of a predetermined thickness or more in which the sulfate-esterified CNF and the sulfate-esterified CNC are mixed and entangled at the interface between the first layer and the second layer. The liquid content in the first layer may be 30 mass % or less, especially 20 mass % or less. The liquid content in the first layer can be adjusted by, after forming a layer of the dispersion, drying the layer to reduce the dispersion medium.

In the step (b), a dispersion containing the other of the sulfate-esterified CNF or the sulfate-esterified CNC is supplied over the first layer, thus forming a second layer on the first layer.

The step (a) and the step (b) may be alternately repeated to form a total of three or more layers of the first layer and the second layer. In this case, in the step (b), the second layer may be dried to adjust the liquid content in the second layer. The liquid content in the second layer after the drying may be more than 0 mass %, especially 5 mass % or more. This allows improvement in the adhesiveness between the second layer and the first layer formed on the second layer. The liquid content in the second layer after the drying may be 30 mass % or less, especially 20 mass % or less.

Subsequently, in the step (c), the first layer and the second layer are dried to remove the dispersion media contained in the first layer and the second layer. Any drying method, such as natural drying, drying under reduced pressure, or hot air drying, can be used. Thus, a layered mixture as described above is obtained.

In the step (a), the first layer may be formed on the above-described substrate, especially the paper substrate, thereby producing a composite including a layered composite and the substrate supporting the layered composite. Since the dispersion on the paper substrate can be quickly dried, such a composite can be produced in a short time.

While the embodiments of the present disclosure are described above in detail, the scope of the claims is not limited to the above-described embodiments, and various changes can be made without departing from the scope of the claims.

EXAMPLES

The following specifically describes the present disclosure with examples, but the present disclosure is not limited to these examples.

(1) Preparation of Samples A to X

Sample A: Sulfate-Esterified CNF Dispersion in Water 300 g of dimethylsulfoxide, 33.3 g of acetic anhydride, and 4.3 g of sulfuric acid having a concentration of 98 mass % were mixed in a 1 L flask by stirring with a stirrer tip. Subsequently, 10 g of needle bleached kraft pulp (NBKP) ("CARIBOO" manufactured by Cariboo Pulp and Paper Company) was added, and stirred at room temperature for four hours, thereby sulfate-esterifying the NBKP. Then, 5% aqueous solution of sodium hydroxide was added dropwise, thus obtaining a reaction mixture with pH 7.0. Subsequently, the reaction mixture was filtrated through a nylon mesh ("PA-11μ" manufactured by AS ONE CORPORATION), and simultaneously rinsed with distilled water. Thus, a sulfate-esterified pulp was obtained. The sulfate-esterified pulp was put in a 1 L flask, distilled water was added to a solid content of 1%, and an ultrasonic treatment was performed. Thus, a sulfate-esterified CNF dispersion in water having a solid content of 1 mass % (Sample A) was obtained.

Sample B: Sulfate-Esterified CNF Dispersion in N,N-Dimethylformamide (DMF)

A sulfate-esterified CNF dispersion in DMF having a solid content of 1 mass % (Sample B) was obtained similarly to Sample A except that DMF was used instead of the distilled water.

Sample C: Sulfate-Esterified CNF Dispersion in Ethylene Glycol

A sulfate-esterified CNF dispersion in ethylene glycol having a solid content of 1 mass % (Sample C) was obtained similarly to Sample A except that ethylene glycol was used instead of the distilled water.

Sample D: Sulfate-Esterified CNF Dispersion in Mixture of Water and Ethanol (Water:Ethanol (Volume Ratio)=80:20)

A sulfate-esterified CNF dispersion in a mixture of water and ethanol having a solid content of 1 mass % (Sample D) was obtained similarly to Sample A except that a mixture of water and ethanol (water:ethanol (volume ratio)=80:20) was used instead of the distilled water.

Sample E: Sulfate-Esterified CNF Dispersion in Mixture of Water and Ethanol (Water:Ethanol (Volume Ratio)=75:25)

A sulfate-esterified CNF dispersion in a mixture of water and ethanol having a solid content of 1 mass % (Sample E) was obtained similarly to Sample A except that a mixture of water and ethanol (water:ethanol (volume ratio)=75:25) was used instead of the distilled water.

Sample F: Sulfate-Esterified CNF Dispersion in Mixture of Ethylene Glycol and Ethanol (Ethylene Glycol:Ethanol (Volume Ratio)=80:20)

A sulfate-esterified CNF dispersion in a mixture of ethylene glycol and ethanol having a solid content of 1 mass % (Sample F) was obtained similarly to Sample A except that a mixture of ethylene glycol and ethanol (ethylene glycol:ethanol (volume ratio)=80:20) was used instead of the distilled water.

Sample G: Sulfate-Esterified CNF Dispersion in Mixture of Ethylene Glycol and Ethanol (Ethylene Glycol:Ethanol (Volume Ratio)=75:25)

A sulfate-esterified CNF dispersion in a mixture of ethylene glycol and ethanol having a solid content of 1 mass % (Sample G) was obtained similarly to Sample A except that a mixture of ethylene glycol and ethanol (ethylene glycol: ethanol (volume ratio)=75:25) was used instead of the distilled water.

Sample H: Sulfate-Esterified CNF Dispersion in Formamide

A sulfate-esterified CNF dispersion in formamide having a solid content of 1 mass % (Sample H) was obtained similarly to Sample A except that formamide was used instead of the distilled water.

Sample I: Sulfate-Esterified CNF Dispersion in Mixture of Formamide and Ethylene Glycol (Formamide:Ethylene Glycol (Volume Ratio)=50:50)

A sulfate-esterified CNF dispersion in a mixture of formamide and ethylene glycol (formamide:ethylene glycol (volume ratio)=50:50) having a solid content of 1 mass % (Sample I) was obtained similarly to Sample A except that a mixture of formamide and ethylene glycol (formamide: ethylene glycol (volume ratio)=50:50) was used instead of the distilled water.

Sample J: Sulfate-Esterified CNF Dispersion in Mixture of Water and Ethylene Glycol (Water:Ethylene Glycol (Volume Ratio)=50:50)

A sulfate-esterified CNF dispersion in a mixture of water and ethylene glycol having a solid content of 1 mass % (Sample J) was obtained similarly to Sample A except that a mixture of distilled water and ethylene glycol (water: ethylene glycol (volume ratio)=50:50) was used instead of the distilled water.

Sample K: Sulfate-Esterified CNF Dispersion in Mixture of Water and Ethylene Glycol (Water:Ethylene Glycol (Volume Ratio)=80:20)

A sulfate-esterified CNF dispersion in a mixture of water and ethylene glycol having a solid content of 1 mass % (Sample K) was obtained similarly to Sample A except that a mixture of distilled water and ethylene glycol (water: ethylene glycol (volume ratio)=80:20) was used instead of the distilled water.

Sample L: TEMPO-Oxidized CNF Dispersion in Water 0.25 mmol of 2,2,6,6-tetramethylpiperidine-N-oxide (TEMPO) and 20 mmol of sodium bromide were dissolved in water, thus obtaining 500 mL of an aqueous solution. 10 g of absolutely dried (i.e., having a water content of 0%) NBKP ("CARIBOO" manufactured by Cariboo Pulp and Paper Company) was added to the aqueous solution, and stirred until the pulp was uniformly dispersed. The temperature of the mixture was made 20° C., and then 64 mmol of an aqueous solution of sodium hypochlorite (manufactured by FUJIFILM Wako Pure Chemical Corporation) was added to start an oxidation reaction. During the reaction, the temperature in the reaction system was kept at 20° C., and pH was kept at 10 by sequentially adding 3N aqueous solution of sodium hydroxide. After the reaction for three hours, the resultant was filtrated with a glass filter, and the filtration residue (filter residue) was sufficiently washed by water. Thus, an oxidized pulp was obtained.

Distilled water was added to the oxidized pulp to a solid content of 1 mass % to obtain a slurry, and the slurry was treated three times at 140 MPa using an ultra-high pressure homogenizer. Thus, a transparent gel-like TEMPO-oxidized CNF dispersion in water (sample L) was obtained.

Sample M: Phosphate-Esterified CNF Dispersion in Water 10 g of urea, 5.53 g of sodium dihydrogen phosphate dihydrate, and 4.13 g of disodium hydrogen phosphate were dissolved in 10.9 g of water, thus preparing a phosphorylation reagent. A sheet obtained by paper making from dried NBKP ("CARIBOO" manufactured by Cariboo Pulp and Paper Company) was treated with a cutter mill and a pin mill to prepare cotton-like fiber. The phosphorylation reagent was evenly sprayed to 10 g (absolute dry mass) of the cotton-like fibers, and the fibers were kneaded by hand to obtain an impregnated pulp. The impregnated pulp was heat-treated for 80 minutes in an air-blow dryer with a damper heated to 140° C. Thus, a phosphorylated pulp was obtained.

1 L of an ion exchanged water was added to 10 g of the phosphorylated pulp, which was then uniformly dispersed by stirring, and the dispersion was filtrated and dehydrated to obtain a sheet. The obtained sheet and 1 L of an ion exchanged water were stirred to be uniformly dispersed, and the dispersion was filtrated and dehydrated to obtain a sheet. The obtained sheet was similarly treated once more. Subsequently, the obtained sheet and 1 L of an ion exchanged water were stirred while 1N aqueous solution of sodium hydroxide was added little by little, thus obtaining a pulp slurry having a pH of 12 to 13. The pulp slurry was dehydrated to obtain a sheet. The sheet and 1 L of an ion exchanged water were stirred to be uniformly dispersed, and the dispersion was filtrated and dehydrated to obtain a sheet. The obtained sheet was similarly treated two more times. The obtained sheet and the ion exchanged water were mixed to obtain 0.5 mass % of a slurry. The slurry was subjected to fibrillation treatment for 180 minutes under a condition of 6900 rpm using a fibrillation treatment apparatus ("Clearmix-11S" manufactured by M Technique Co., Ltd.). The ion exchanged water was added to adjust the solid content in the slurry to 1 mass %. Thus, a phosphate-esterified CNF dispersion in water having a solid content of 1 mass % (Sample M) was obtained.

Sample N: Sulfate-Esterified CNC Dispersion in Water 800 mL of 58% sulfuric acid was heated to 50° C. in a 2 L flask. 100 g of absolutely dried NBKP ("CARIBOO" manufactured by Cariboo Pulp and Paper Company) was put in the flask, and stirred for three hours. The resultant was treated at 20,000 G for 10 minutes with a centrifugal separator ("CT18R" manufactured by Eppendorf Himac Technologies Co., Ltd.). Subsequently, a supernatant liquid was removed by decantation, and 400 mL of distilled water was added to cause a pellet to be suspended. Similar centrifugal separation treatment, decantation, addition of distilled water, and suspension treatment were performed two more times. Thus, a sulfate-esterified CNC dispersion in water (Sample N) was obtained.

Sample O: Sulfate-Esterified CNC Dispersion in DMF

Sample N was dried with a freeze dryer ("FDU-12AS" manufactured by AS ONE CORPORATION), thereby obtaining a CNC powder. DMF was added to the CNC powder so as to have a solid content of 1 mass %, which was treated for two minutes with Homodisperser Model 2.5 manufactured by Primix. Thus, a CNC dispersion in DMF having a solid content of 1 mass % (Sample O) was obtained.

Sample P: CNC Dispersion in Ethylene Glycol

A CNC dispersion in ethylene glycol having a solid content of 1 mass % (sample P) was obtained similarly to Sample O except that ethylene glycol was used instead of DMF.

Sample Q: Sulfate-Esterified CNC Dispersion in Mixture of Water and Ethanol (Water:Ethanol (Volume Ratio)=80:20)

A sulfate-esterified CNC dispersion in a mixture of water and ethanol having a solid content of 1 mass % (Sample Q) was obtained similarly to Sample O except that a mixture of water and ethanol (water:ethanol (volume ratio)=80:20) was used instead of DMF.

Sample R: Sulfate-Esterified CNC Dispersion in Mixture of Water and Ethanol (Water:Ethanol (Volume Ratio)=75:25)

A sulfate-esterified CNC dispersion in a mixture of water and ethanol having a solid content of 1 mass % (Sample R) was obtained similarly to Sample O except that a mixture of water and ethanol (water:ethanol (volume ratio)=75:25) was used instead of DMF.

Sample S: Sulfate-Esterified CNC Dispersion in Mixture of Ethylene Glycol and Ethanol (Ethylene Glycol:Ethanol (Volume Ratio)=80:20)

A sulfate-esterified CNC dispersion in a mixture of ethylene glycol and ethanol having a solid content of 1 mass % (Sample S) was obtained similarly to Sample O except that a mixture of ethylene glycol and ethanol (ethylene glycol: ethanol (volume ratio)=80:20) was used instead of DMF.

Sample T: Sulfate-Esterified CNC Dispersion in Mixture of Ethylene Glycol and Ethanol (Ethylene Glycol:Ethanol (Volume Ratio)=75:25)

A sulfate-esterified CNC dispersion in a mixture of ethylene glycol and ethanol having a solid content of 1 mass % (Sample T) was obtained similarly to Sample O except that a mixture of ethylene glycol and ethanol (ethylene glycol: ethanol (volume ratio)=75:25) was used instead of DMF.

Sample U: CNC Dispersion in Formamide

A CNC dispersion in formamide having a solid content of 1 mass % (Sample U) was obtained similarly to Sample O except that formamide was used instead of DMF.

Sample V: Sulfate-Esterified CNC Dispersion in Mixture of Formamide and Ethylene Glycol (Formamide:Ethylene Glycol (Volume Ratio)=50:50)

A sulfate-esterified CNC dispersion in a mixture of formamide and ethylene glycol having a solid content of 1 mass % (Sample V) was obtained similarly to Sample O except that a mixture of formamide and ethylene glycol (formamide:ethylene glycol (volume ratio)=50:50) was used instead of DMF.

Sample W: Sulfate-Esterified CNC Dispersion in Mixture of Water and Ethylene Glycol (Water:Ethylene Glycol (Volume Ratio)=50:50)

A sulfate-esterified CNC dispersion in a mixture of water and ethylene glycol having a solid content of 1 mass % (Sample W) was obtained similarly to Sample O except that a mixture of water and ethylene glycol (water:ethylene glycol (volume ratio)=50:50) was used instead of DMF.

Sample X: Sulfate-Esterified CNC Dispersion in Mixture of Water and Ethylene Glycol (Water:Ethylene Glycol (Volume Ratio)=80:20)

A sulfate-esterified CNC dispersion in a mixture of water and ethylene glycol having a solid content of 1 mass % (Sample X) was obtained similarly to Sample O except that a mixture of water and ethylene glycol (water:ethylene glycol (volume ratio)=80:20) was used instead of DMF.

(2) Preparing Dispersion and Producing Composite

Example 1

75 mL of Sample A and 75 mL of Sample N were mixed in a 300 mL polypropylene beaker for five minutes with Homodisperser Model 2.5 manufactured by Primix, thereby obtaining a dispersion in which the sulfate-esterified CNF and the sulfate-esterified CNC (CNF:CNC=50:50 (mass ratio)) were dispersed in water (relative permittivity 80.4).

The entire amount of the dispersion was poured into a square PTFE container with inside dimensions of 20 cm×20 cm×5 cm, and naturally dried at room temperature for two weeks to form a film. The film was extracted from the PTFE container and cut by a sample cutter ("SDL200" manufactured by DUMBBELL CO., LTD.), thereby producing a dumbbell-shaped composite containing the sulfate-esterified CNF and the sulfate-esterified CNC (CNF:CNC=50:50 (mass ratio)). The composite had a part for testing with a thickness of 25 μm, a width of 10 mm, and a length of 100 mm.

Example 2

A dispersion in which the sulfate-esterified CNF and the sulfate-esterified CNC (CNF:CNC=0.5:99.5 (mass ratio)) were dispersed in water and a dumbbell-shaped composite containing the sulfate-esterified CNF and the sulfate-esterified CNC (CNF:CNC=0.5:99.5 (mass ratio)) were obtained similarly to Example 1 except that 0.75 mL of Sample A and 149.25 mL of Sample N were used instead of 75 mL of Sample A and 75 mL of Sample N.

Example 3

A dispersion in which the sulfate-esterified CNF and the sulfate-esterified CNC (CNF:CNC=1:99 (mass ratio)) were dispersed in water and a dumbbell-shaped composite containing the sulfate-esterified CNF and the sulfate-esterified CNC (CNF:CNC=1:99 (mass ratio)) were obtained similarly to Example 1 except that 1.5 mL of Sample A and 148.5 mL of Sample N were used instead of 75 mL of Sample A and 75 mL of Sample N.

Example 4

A dispersion in which the sulfate-esterified CNF and the sulfate-esterified CNC (CNF:CNC=25:75 (mass ratio)) were dispersed in water and a dumbbell-shaped composite containing the sulfate-esterified CNF and the sulfate-esterified CNC (CNF:CNC=25:75 (mass ratio)) were obtained similarly to Example 1 except that 37.5 mL of Sample A and 112.5 mL of Sample N were used instead of 75 mL of Sample A and 75 mL of Sample N.

Example 5

A dispersion in which the sulfate-esterified CNF and the sulfate-esterified CNC (CNF:CNC=75:25 (mass ratio)) were dispersed in water and a dumbbell-shaped composite containing the sulfate-esterified CNF and the sulfate-esterified CNC (CNF:CNC=75:25 (mass ratio)) were obtained similarly to Example 1 except that 112.5 mL of Sample A and 37.5 mL of Sample N were used instead of 75 mL of Sample A and 75 mL of Sample N.

Example 6

A dispersion in which the sulfate-esterified CNF and the sulfate-esterified CNC (CNF:CNC=99:1 (mass ratio)) were dispersed in water and a dumbbell-shaped composite containing the sulfate-esterified CNF and the sulfate-esterified CNC (CNF:CNC=99:1 (mass ratio)) were obtained similarly to Example 1 except that 148.5 mL of Sample A and 1.5 mL of Sample N were used instead of 75 mL of Sample A and 75 mL of Sample N.

Example 7

A dispersion in which the sulfate-esterified CNF and the sulfate-esterified CNC (CNF:CNC=99.5:0.5 (mass ratio)) were dispersed in water and a dumbbell-shaped composite containing the sulfate-esterified CNF and the sulfate-esterified CNC (CNF:CNC=99.5:0.5 (mass ratio)) were obtained similarly to Example 1 except that 149.25 mL of Sample A and 0.75 mL of Sample N were used instead of 75 mL of Sample A and 75 mL of Sample N.

Example 8

A dispersion in which the sulfate-esterified CNF and the sulfate-esterified CNC (CNF:CNC=50:50 (mass ratio)) were dispersed in DMF (relative permittivity 38) was obtained similarly to Example 1 except that 75 mL of Sample B and 75 mL of Sample O were used instead of 75 mL of Sample A and 75 mL of Sample N. From this dispersion, a dumbbell-shaped composite containing the sulfate-esterified CNF and the sulfate-esterified CNC (CNF:CNC=50:50 (mass ratio)) was obtained similarly to Example 1 except that the dispersion was dried at 150° C. for five hours under reduced pressure with a vacuum dryer (“APD200” manufactured by Yamato Scientific Co., Ltd.) instead of the natural drying.

Example 9

A dispersion in which the sulfate-esterified CNF and the sulfate-esterified CNC (CNF:CNC=50:50 (mass ratio)) were dispersed in ethylene glycol (relative permittivity 38.7) and a dumbbell-shaped composite containing the sulfate-esterified CNF and the sulfate-esterified CNC (CNF:CNC=50:50 (mass ratio)) were obtained similarly to Example 8 except that 75 mL of Sample C and 75 mL of Sample P were used instead of 75 mL of Sample B and 75 mL of Sample O.

Example 10

A dispersion in which the sulfate-esterified CNF and the sulfate-esterified CNC (CNF:CNC=50:50 (mass ratio)) were dispersed in a mixture of water (relative permittivity 80.4) and ethanol (relative permittivity 25.3) (water:ethanol (volume ratio)=80:20), and a dumbbell-shaped composite containing the sulfate-esterified CNF and the sulfate-esterified CNC (CNF:CNC=50:50 (mass ratio)) were obtained similarly to Example 1 except that 75 mL of Sample D and 75 mL of Sample Q were used instead of 75 mL of Sample A and 75 mL of Sample N.

Example 11

A dispersion in which the sulfate-esterified CNF and the sulfate-esterified CNC (CNF:CNC=50:50 (mass ratio)) were dispersed in a mixture of water and ethanol (water:ethanol (volume ratio)=75:25), and a dumbbell-shaped composite containing the sulfate-esterified CNF and the sulfate-esterified CNC (CNF:CNC=50:50 (mass ratio)) were obtained similarly to Example 1 except that 75 mL of Sample E and 75 mL of Sample R were used instead of 75 mL of Sample A and 75 mL of Sample N.

Example 12

A dispersion in which the sulfate-esterified CNF and the sulfate-esterified CNC (CNF:CNC=50:50 (mass ratio)) were dispersed in a mixture of ethylene glycol and ethanol (ethylene glycol:ethanol (volume ratio)=80:20), and a dumbbell-shaped composite containing the sulfate-esterified CNF and the sulfate-esterified CNC (CNF:CNC=50:50 (mass ratio)) were obtained similarly to Example 8 except that 75 mL of Sample F and 75 mL of Sample S were used instead of 75 mL of Sample B and 75 mL of Sample O.

Example 13

A dispersion in which the sulfate-esterified CNF and the sulfate-esterified CNC (CNF:CNC=50:50 (mass ratio)) were dispersed in a mixture of ethylene glycol and ethanol (ethylene glycol:ethanol (volume ratio)=75:25), and a dumbbell-shaped composite containing the sulfate-esterified CNF and the sulfate-esterified CNC (CNF:CNC=50:50 (mass ratio)) were obtained similarly to Example 8 except that 75 mL of Sample G and 75 mL of Sample T were used instead of 75 mL of Sample B and 75 mL of Sample O.

Example 14

A dispersion in which the sulfate-esterified CNF and the sulfate-esterified CNC (CNF:CNC=50:50 (mass ratio)) were dispersed in formamide (relative permittivity 110) was obtained similarly to Example 1 except that 75 mL of Sample H and 75 mL of Sample U were used instead of 75 mL of Sample A and 75 mL of Sample N. From this dispersion, a dumbbell-shaped composite containing the sulfate-esterified CNF and the sulfate-esterified CNC (CNF:CNC=50:50 (mass ratio)) was obtained similarly to Example 1 except that the dispersion was dried at 150° C. for ten hours under reduced pressure with a vacuum dryer (“APD200” manufactured by Yamato Scientific Co., Ltd.) instead of the natural drying.

Example 15

A dispersion in which the sulfate-esterified CNF and the sulfate-esterified CNC (CNF:CNC=50:50 (mass ratio)) were dispersed in a mixture of formamide and ethylene glycol (formamide:ethylene glycol (volume ratio)=50:50), and a dumbbell-shaped composite containing the sulfate-esterified CNF and the sulfate-esterified CNC (CNF:CNC=50:50 (mass ratio)) were obtained similarly to Example 14 except that 75 mL of Sample I and 75 mL of Sample V were used instead of 75 mL of Sample H and 75 mL of Sample U.

Example 16

A dispersion in which the sulfate-esterified CNF and the sulfate-esterified CNC (CNF:CNC=50:50 (mass ratio)) were dispersed in a mixture of water and ethylene glycol (water:ethylene glycol (volume ratio)=50:50), and a dumbbell-shaped composite containing the sulfate-esterified CNF and the sulfate-esterified CNC (CNF:CNC=50:50 (mass ratio)) were obtained similarly to Example 14 except that 75 mL of Sample J and 75 mL of Sample W were used instead of 75 mL of Sample H and 75 mL of Sample U.

Example 17

A dispersion in which the sulfate-esterified CNF and the sulfate-esterified CNC (CNF:CNC=50:50 (mass ratio)) were dispersed in a mixture of water and ethylene glycol (water:ethylene glycol (volume ratio)=80:20), and a dumbbell-shaped composite containing the sulfate-esterified CNF and the sulfate-esterified CNC (CNF:CNC=50:50 (mass ratio)) were obtained similarly to Example 14 except that 75 mL of Sample K and 75 mL of Sample X were used instead of 75 mL of Sample H and 75 mL of Sample U.

Example 18

150 mL of Sample A, 150 mL of Sample N, and 0.0015 g of silica microparticles ("HS-208" manufactured by NIPPON STEEL Chemical & Material CO., LTD.) were mixed in a 300 mL polypropylene beaker for five minutes with Homodisperser Model 2.5 manufactured by Primix, thereby obtaining a dispersion in which the sulfate-esterified CNF, the sulfate-esterified CNC, and silica microparticles (CNF:CNC:silica=50:50:0.05 (mass ratio)) were dispersed in water. Using half of the dispersion, a dumbbell-shaped composite containing the sulfate-esterified CNF, the sulfate-esterified CNC, and the silica microparticles (CNF:CNC:silica=50:50:0.05 (mass ratio)) was produced similarly to Example 1.

Example 19

A dispersion in which the sulfate-esterified CNF, the sulfate-esterified CNC, and the silica microparticles (CNF:CNC:silica=50:50:0.1 (mass ratio)) were dispersed in water and a dumbbell-shaped composite containing the sulfate-esterified CNF, the sulfate-esterified CNC, and the silica microparticles (CNF:CNC:silica=50:50:0.1 (mass ratio)) were obtained similarly to Example 18 except that 0.003 g of silica microparticles was used.

Example 20

A dispersion in which the sulfate-esterified CNF, the sulfate-esterified CNC, and the silica microparticles (CNF:CNC:silica=50:50:2.5 (mass ratio)) were dispersed in water and a dumbbell-shaped composite containing the sulfate-esterified CNF, the sulfate-esterified CNC, and the silica microparticles (CNF:CNC:silica=50:50:2.5 (mass ratio)) were obtained similarly to Example 18 except that 0.075 g of silica microparticles was used.

Example 21

A dispersion in which the sulfate-esterified CNF, the sulfate-esterified CNC, and the silica microparticles (CNF:CNC:silica=50:50:5.0 (mass ratio)) were dispersed in water and a dumbbell-shaped composite containing the sulfate-esterified CNF, the sulfate-esterified CNC, and the silica microparticles (CNF:CNC:silica=50:50:5.0 (mass ratio)) were obtained similarly to Example 18 except that 0.15 g of silica microparticles was used.

Example 22

A dispersion in which the sulfate-esterified CNF, the sulfate-esterified CNC, and the silica microparticles (CNF:CNC:silica=50:50:6.0 (mass ratio)) were dispersed in water and a dumbbell-shaped composite containing the sulfate-esterified CNF, the sulfate-esterified CNC, and the silica microparticles (CNF:CNC:silica=50:50:6.0 (mass ratio)) were obtained similarly to Example 18 except that 0.18 g of silica microparticles was used.

Example 23

375 mL of Sample A and 375 mL of Sample N were treated at 150 MPa three times using a microfluidizer ("M-110EH" manufactured by Microfluidics) to be mixed. Thus, a dispersion in which the sulfate-esterified CNF and the sulfate-esterified CNC (CNF:CNC=50:50 (mass ratio)) were dispersed in water was obtained. Using 150 mL of the dispersion, a dumbbell-shaped composite containing the sulfate-esterified CNF and the sulfate-esterified CNC (CNF:CNC=50:50 (mass ratio)) was produced similarly to Example 1.

Example 24

75 mL of Sample A and 75 mL of Sample N were poured into a 500 mL polypropylene bottle and sealed, and the bottle was allowed to stand in a water bath at 80° C. for 24 hours. Sample A and Sample N were mixed due to heat convection. Thus, a dispersion in which the sulfate-esterified CNF and the sulfate-esterified CNC (CNF:CNC=50:50 (mass ratio)) were dispersed in water was obtained. Using the entire amount of the dispersion, a dumbbell-shaped composite containing the sulfate-esterified CNF and the sulfate-esterified CNC (CNF:CNC=50:50 (mass ratio)) was produced similarly to Example 1.

Comparative Example 1

A dispersion in which the TEMPO-oxidized CNF and the sulfate-esterified CNC (CNF:CNC=50:50 (mass ratio)) were dispersed in water and a dumbbell-shaped composite containing the TEMPO-oxidized CNF and the sulfate-esterified CNC (CNF:CNC=50:50 (mass ratio)) were obtained similarly to Example 1 except that Sample L was used instead of Sample A.

Comparative Example 2

A dispersion in which the phosphate-esterified CNF and the sulfate-esterified CNC (CNF:CNC=50:50 (mass ratio)) were dispersed in water and a dumbbell-shaped composite containing the phosphate-esterified CNF and the sulfate-esterified CNC (CNF:CNC=50:50 (mass ratio)) were obtained similarly to Example 1 except that Sample M was used instead of Sample A.

Example 25

The dispersion of CNF and CNC prepared similarly to Example 1 was dried with a freeze dryer ("FDU-12AS" manufactured by AS ONE CORPORATION), thereby obtaining a dry powder. 3 g of the dry powder was combined with 97 g of a polyurethane pellet ("Elastollan" manufactured by BASF) and rolled four times at 100° C. through a three-roll mill (manufactured by Imoto machinery Co., LTD., 1983 model). The obtained film was cut by a sample cutter ("SDL200" manufactured by DUMBBELL CO., LTD.), thereby producing a dumbbell-shaped composite containing the sulfate-esterified CNF and the sulfate-esterified CNC (CNF:CNC=50:50 (mass ratio)), and a polyurethane resin.

Example 26

4.68 mL of the dispersion of CNF and CNC prepared similarly to Example 1, 1.5 g of polyvinyl alcohol microparticles ("KURARAY POVAL" manufactured by Kuraray Co., Ltd.), and 100 mL of distilled water were stirred in a beaker for 24 hours, thereby obtaining a dispersion. Using the obtained dispersion, a dumbbell-shaped composite containing the sulfate-esterified CNF and the sulfate-esterified CNC (CNF:CNC=50:50 (mass ratio)), and polyvinyl alcohol was produced similarly to Example 1.

Example 27

300 mL of a dispersion in which the sulfate-esterified CNF and the sulfate-esterified CNC (CNF:CNC=50:50 (mass ratio)) were dispersed in water was obtained similarly to Example 1 except that 150 mL of Sample A and 150 mL of Sample N were used. The dispersion was mixed with 194 g of a natural rubber latex having a solid content of 50 mass % (manufactured by KENIS LIMITED) at ordinary temperature. 3 g of a radical generator ("PERHEXA 25B-40" manufactured by NOF CORPORATION) was added thereto, and the mixture was put in a Teflon (registered trademark) tray and dried at 80° C. for three days. The resultant was rolled four times at 100° C. through a three-roll mill (manufactured by Imoto machinery Co., LTD., 1983 model). The obtained film was cut by a sample cutter ("SDL200" manufactured by DUMBBELL CO., LTD.), thereby producing a dumbbell-shaped composite containing the sulfate-esterified CNF and the sulfate-esterified CNC (CNF:CNC=50:50 (mass ratio)), and a natural rubber.

Example 28

4.68 mL of the dispersion of CNF and CNC prepared similarly to Example 1, 1.5 g of polyvinyl alcohol microparticles ("KURARAY POVAL" manufactured by Kuraray Co., Ltd.), and 100 mL of distilled water were stirred in a beaker for 24 hours, thereby obtaining a dispersion. 0.01 g of TN hydrochloric acid and 0.3 g of 37 mass % aqueous solution of formaldehyde were added to the obtained dispersion. Thus, a crosslinked structure via an acetal bond was formed. Using the dispersion after the cross-linking reaction, a dumbbell-shaped composite was produced similarly to Example 1.

Example 29

41 g of diphenylmethane diisocyanate was added to 150 g of the dispersion of CNF and CNC prepared similarly to Example 9, which was stirred at 50° C. for three hours. Thus, an OH group of CNF, CNC, and ethylene glycol reacted with an NCO group of diphenylmethane diisocyanate, thereby forming a urethane bond. As a result, a crosslinked material containing CNF, CNC, and a urethane resin crosslinked through the urethane bond was obtained. After the reaction, the dispersion was rolled four times at 100° C. through a three-roll mill (manufactured by Imoto machinery Co., LTD., 1983 model). The obtained film was cut by a sample cutter ("SDL200" manufactured by DUMBBELL CO., LTD.), thereby producing a dumbbell-shaped composite.

Example 30

4.68 mL of the dispersion of CNF and CNC prepared similarly to Example 1, 1.5 g of polyvinyl alcohol microparticles ("KURARAY POVAL" manufactured by Kuraray Co., Ltd.), 100 mL of distilled water, and 0.05 g of diphenylmethane diisocyanate were stirred at 50° C. for 24 hours. Thus, a crosslinked structure via a urethane bond was formed. After the cross-linking reaction, the dispersion was used to produce a dumbbell-shaped composite similarly to Example 1.

Example 31

20.5 g of diphenylmethane diisocyanate was added to 150 g of the dispersion of CNF and CNC prepared similarly to Example 16, which was stirred at 50° C. for three hours. Thus, an OH group of CNF, CNC, and ethylene glycol reacted with an NCO group of diphenylmethane diisocyanate, thereby forming a urethane bond. As a result, a crosslinked material containing CNF, CNC, and a urethane resin crosslinked through the urethane bond was obtained. After the reaction, the dispersion was rolled four times at 100° C. through a three-roll mill (manufactured by Imoto machinery Co., LTD., 1983 model). The obtained film was cut by a sample cutter ("SDL200" manufactured by DUMBBELL CO., LTD.), thereby producing a dumbbell-shaped composite.

Example 32

75 mL of Sample A was poured into a square PTFE container with inside dimensions of 20 cm×20 cm×5 cm, and naturally dried until its liquid content became 20 mass %. The liquid content was monitored based on the change in mass. 75 mL of Sample N was further poured into the PTFE container, and naturally dried for two weeks. A film formed in the PTFE container was extracted, and a dumbbell-shaped composite was produced similarly to Example 1.

Example 33

50 mL of Sample A was poured into a square PTFE container with inside dimensions of 20 cm×20 cm×5 cm, and naturally dried until its liquid content became 20 mass %. The liquid content was monitored based on the change in mass. 50 mL of Sample N was further poured into the PTFE container, and naturally dried until its liquid content became 20 mass %. 50 mL of Sample A was further poured into the PTFE container, and naturally dried for two weeks. A film formed in the PTFE container was extracted, and a dumbbell-shaped composite was produced similarly to Example 1.

Example 34

50 mL of Sample N was poured into a square PTFE container with inside dimensions of 20 cm×20 cm×5 cm, and naturally dried until its liquid content became 20 mass %. The liquid content was monitored based on the change in mass. 50 mL of Sample A was further poured into the PTFE container, and naturally dried until its liquid content became 20 mass %. 50 mL of Sample N was further poured into the PTFE container, and naturally dried for two weeks. A film formed in the PTFE container was extracted, and a dumbbell-shaped composite was produced similarly to Example 1.

Example 35

500 mL of Sample A and 0.0025 g of silica microparticles ("HS-208" manufactured by NIPPON STEEL Chemical & Material CO., LTD.) were mixed for five minutes with Homodisperser Model 2.5 manufactured by Primix, thereby obtaining a dispersion in which CNF and silica microparticles were dispersed in water. Additionally, 500 mL of Sample N and 0.0025 g of silica microparticles ("HS-208" manufactured by NIPPON STEEL Chemical & Material CO., LTD.) were mixed for five minutes with Homodisperser Model 2.5 manufactured by Primix, thereby obtaining a dispersion in which CNC and silica microparticles were dispersed in water.

75 mL of the dispersion of CNF and silica microparticles was poured into a square PTFE container with inside dimensions of 20 cm×20 cm×5 cm, and naturally dried until its liquid content became 20 mass %. The liquid content was monitored based on the change in mass. 75 mL of the dispersion of CNC and silica microparticles was further poured into the PTFE container, and naturally dried for two weeks. A film formed in the PTFE container was extracted, and a dumbbell-shaped composite was produced similarly to Example 1.

Example 36

A dumbbell-shaped composite was produced similarly to Example 35 except that the respective amounts of the silica microparticles mixed with Sample A and Sample N were changed to 0.005 g.

Example 37

A dumbbell-shaped composite was produced similarly to Example 35 except that the respective amounts of the silica microparticles mixed with Sample A and Sample N were changed to 0.125 g.

Example 38

A dumbbell-shaped composite was produced similarly to Example 35 except that the respective amounts of the silica microparticles mixed with Sample A and Sample N were changed to 0.25 g.

Example 39

A dumbbell-shaped composite was produced similarly to Example 35 except that the respective amounts of the silica microparticles mixed with Sample A and Sample N were changed to 0.30 g.

Example 40

A dumbbell-shaped composite was produced similarly to Example 35 except that the amount of the silica microparticles mixed with Sample A was changed to 0.005 g and no silica microparticle was mixed with Sample N.

Example 41

A dumbbell-shaped composite was produced similarly to Example 35 except that no silica microparticle was mixed with Sample A and the amount of the silica microparticles mixed with Sample N was not 0.005 g.

Example 42

2.34 mL of Sample A, 0.75 g of polyvinyl alcohol microparticles ("KURARAY POVAL" manufactured by Kuraray Co., Ltd.), and 100 mL of distilled water were stirred in a beaker for 24 hours, thereby obtaining a dispersion containing CNF and polyvinyl alcohol.

The obtained dispersion was poured into a square PTFE container with inside dimensions of 20 cm×20 cm×5 cm, and naturally dried until its liquid content became 20 mass %. The liquid content was monitored based on the change in mass. 75 mL of Sample N was further poured into the PTFE container, and naturally dried for two weeks. A film formed in the PTFE container was extracted, and a dumbbell-shaped composite was produced similarly to Example 1.

Example 43

2.34 mL of Sample N, 0.75 g of polyvinyl alcohol microparticles ("KURARAY POVAL" manufactured by Kuraray Co., Ltd.), and 100 mL of distilled water were stirred in a beaker for 24 hours, thereby obtaining a dispersion containing CNC and polyvinyl alcohol.

75 mL of Sample A was poured into a square PTFE container with inside dimensions of 20 cm×20 cm×5 cm, and naturally dried until its liquid content became 20 mass %. The liquid content was monitored based on the change in mass. The dispersion containing CNC and polyvinyl alcohol was further poured into the PTFE container, and naturally dried for two weeks. A film formed in the PTFE container was extracted, and a dumbbell-shaped composite was produced similarly to Example 1.

Example 44

A dispersion containing CNF and polyvinyl alcohol was prepared similarly to Example 42. Additionally, a dispersion containing CNC and polyvinyl alcohol was prepared similarly to Example 43.

The dispersion containing CNF and polyvinyl alcohol was poured into a square PTFE container with inside dimensions of 20 cm×20 cm×5 cm, and naturally dried until its liquid content became 20 mass %. The liquid content was monitored based on the change in mass. The dispersion containing CNC and polyvinyl alcohol was further poured into the PTFE container, and naturally dried for two weeks. A film formed in the PTFE container was extracted, and a dumbbell-shaped composite was produced similarly to Example 1.

Example 45

2.34 mL of Sample A, 0.75 g of polyvinyl alcohol microparticles ("KURARAY POVAL" manufactured by Kuraray Co., Ltd.), and 100 mL of distilled water were stirred in a beaker for 24 hours, thereby obtaining a dispersion containing CNF and polyvinyl alcohol. 0.01 g of 1N hydrochloric acid and 0.3 g of 37 mass % aqueous solution of formaldehyde were added to the obtained dispersion. Thus, a crosslinked structure via an acetal bond was formed.

2.34 mL of Sample N, 0.75 g of polyvinyl alcohol microparticles ("KURARAY POVAL" manufactured by Kuraray Co., Ltd.), and 100 mL of distilled water were stirred in a beaker for 24 hours, thereby obtaining a dispersion containing CNC and polyvinyl alcohol. 0.01 g of TN hydrochloric acid and 0.3 g of 37 mass % aqueous solution of formaldehyde were added to the obtained dispersion. Thus, a crosslinked structure via an acetal bond was formed.

The dispersion containing CNF and polyvinyl alcohol after the cross-linking reaction was poured into a square PTFE container with inside dimensions of 20 cm×20 cm×5 cm, and naturally dried until its liquid content became 20 mass %. The liquid content was monitored based on the change in mass. The dispersion containing CNC and polyvinyl alcohol after the cross-linking reaction was further poured into the PTFE container, and naturally dried for two weeks. A film formed in the PTFE container was extracted, and a dumbbell-shaped composite was produced similarly to Example 1.

Example 46

2.34 mL of Sample A, 0.75 g of polyvinyl alcohol microparticles (“KURARAY POVAL” manufactured by Kuraray Co., Ltd.), 100 mL of distilled water, and 0.025 g of diphenylmethane diisocyanate were stirred at 50° C. for three hours. Thus, a crosslinked structure via a urethane bond was formed.

2.34 mL of Sample N, 0.75 g of polyvinyl alcohol microparticles (“KURARAY POVAL” manufactured by Kuraray Co., Ltd.), 100 mL of distilled water, and 0.025 g of diphenylmethane diisocyanate were stirred at 50° C. for three hours. Thus, a crosslinked structure via a urethane bond was formed.

The dispersion containing CNF and polyvinyl alcohol after the cross-linking reaction was poured into a square PTFE container with inside dimensions of 20 cm×20 cm×5 cm, and naturally dried until its liquid content became 20 mass %. The liquid content was monitored based on the change in mass. The dispersion containing CNC and polyvinyl alcohol after the cross-linking reaction was further poured into the PTFE container, and naturally dried for two weeks. A film formed in the PTFE container was extracted, and a dumbbell-shaped composite was produced similarly to Example 1.

Example 47

A dumbbell-shaped composite was produced similarly to Example 32 except that Sample A was naturally dried until its liquid content became 5 mass % instead of performing the natural drying until the liquid content became 20 mass %.

Example 48

A dumbbell-shaped composite was produced similarly to Example 32 except that Sample A was dried at 105° C. for three hours to reach the liquid content of 0 mass % instead of performing the natural drying until the liquid content became 20 mass %.

Example 49

A paper substrate (qualitative filter paper No. 1, manufactured by ADVANTEC CO., LTD.) was cut into a square shape with a size of 19.5 cm×19.5 cm, and put in a square PTFE container with inside dimensions of 20 cm×20 cm×5 cm. The entire amount of the dispersion of CNF and CNC prepared similarly to Example 1 was poured into the PTFE container, and naturally dried at room temperature for two weeks to form a film. The paper substrate and the film were extracted from the PTFE container, and cut by a sample cutter (“SDL200” manufactured by DUMBBELL CO., LTD.). Thus, a dumbbell-shaped composite that includes the paper substrate and the film containing the sulfate-esterified CNF and the sulfate-esterified CNC (CNF:CNC=50:50 (mass ratio)) was obtained.

Example 50

A dumbbell-shaped composite was produced similarly to Example 49 except that a cardboard base paper (“LCC120” manufactured by Rengo Co., Ltd.) was used as the paper substrate.

Example 51

A paper substrate (qualitative filter paper No. 1, manufactured by ADVANTEC CO., LTD.) was cut into a square shape with a size of 19.5 cm×19.5 cm, and put in a square PTFE container with inside dimensions of 20 cm×20 cm×5 cm. 75 mL of Sample A was poured into the PTFE container, and naturally dried until its liquid content became 20 mass %. The liquid content was monitored based on the change in mass. 75 mL of Sample N was further poured into the PTFE container, and naturally dried for two weeks. The paper substrate and the film were extracted from the PTFE container, and cut by a sample cutter (“SDL200” manufactured by DUMBBELL CO., LTD.). Thus, a dumbbell-shaped composite that includes the paper substrate, a CNF layer, and a CNC layer was obtained.

Example 52

A dumbbell-shaped composite was produced similarly to Example 51 except that a cardboard base paper (“LCC120” manufactured by Rengo Co., Ltd.) was used as the paper substrate.

Tables 1, 2 simply indicate the various conditions of Examples 1 to 52 and Comparative Examples 1 and 2.

TABLE 1

| | CNF Type | Dispersion Medium | CNF:CNC:Silica (Mass Ratio) | Means of Mixing CNF and CNC | Resin/ Rubber | Cross-Linkage |
|---|---|---|---|---|---|---|
| Example 1 | Sulfate-Esterified | Water | 50:50:0 | Disperser | None | None |
| Example 2 | Sulfate-Esterified | Water | 0.5:99.5:0 | Disperser | None | None |
| Example 3 | Sulfate-Esterified | Water | 1:99:0 | Disperser | None | None |
| Example 4 | Sulfate-Esterified | Water | 25:75:0 | Disperser | None | None |
| Example 5 | Sulfate-Esterified | Water | 75:25:0 | Disperser | None | None |
| Example 6 | Sulfate-Esterified | Water | 99:1:0 | Disperser | None | None |
| Example 7 | Sulfate-Esterified | Water | 99.5:0.5:0 | Disperser | None | None |
| Example 8 | Sulfate-Esterified | DMF | 50:50:0 | Disperser | None | None |
| Example 9 | Sulfate-Esterified | EG | 50:50:0 | Disperser | None | None |
| Example 10 | Sulfate-Esterified | Water and EtOH (80:20) | 50:50:0 | Disperser | None | None |

TABLE 1-continued

| | CNF Type | Dispersion Medium | CNF:CNC:Silica (Mass Ratio) | Means of Mixing CNF and CNC | Resin/ Rubber | Cross-Linkage |
|---|---|---|---|---|---|---|
| Example 11 | Sulfate-Esterified | Water and EtOH (75:25) | 50:50:0 | Disperser | None | None |
| Example 12 | Sulfate-Esterified | EG and EtOH (80:20) | 50:50:0 | Disperser | None | None |
| Example 13 | Sulfate-Esterified | EG and EtOH (75:25) | 50:50:0 | Disperser | None | None |
| Example 14 | Sulfate-Esterified | FA | 50:50:0 | Disperser | None | None |
| Example 15 | Sulfate-Esterified | FA and EG (50:50) | 50:50:0 | Disperser | None | None |
| Example 16 | Sulfate-Esterified | Water and EG (50:50) | 50:50:0 | Disperser | None | None |
| Example 17 | Sulfate-Esterified | Water and EG (80:20) | 50:50:0 | Disperser | None | None |
| Example 18 | Sulfate-Esterified | Water | 50:50:0.05 | Disperser | None | None |
| Example 19 | Sulfate-Esterified | Water | 50:50:0.1 | Disperser | None | None |
| Example 20 | Sulfate-Esterified | Water | 50:50:2.5 | Disperser | None | None |
| Example 21 | Sulfate-Esterified | Water | 50:50:5.0 | Disperser | None | None |
| Example 22 | Sulfate-Esterified | Water | 50:50:6.0 | Disperser | None | None |
| Example 23 | Sulfate-Esterified | Water | 50:50:0 | Microfluidizer | None | None |
| Example 24 | Sulfate-Esterified | Water | 50:50:0 | Heat Convection | None | None |
| Comparative Example 1 | TEMPO-Oxidized | Water | 50:50:0 | Disperser | None | None |
| Comparative Example 2 | Phosphate-Esterified | Water | 50:50:0 | Disperser | None | None |
| Example 25 | Sulfate-Esterified | Water | 50:50:0 | Disperser | PU | None |
| Example 26 | Sulfate-Esterified | Water | 50:50:0 | Disperser | PVA | None |
| Example 27 | Sulfate-Esterified | Water | 50:50:0 | Disperser | Natural Rubber | None |
| Example 28 | Sulfate-Esterified | Water | 50:50:0 | Disperser | PVA | Present (Acetal Bond) |
| Example 29 | Sulfate-Esterified | EG | 50:50:0 | Disperser | PU | Present (Urethane Bond) |
| Example 30 | Sulfate-Esterified | Water | 50:50:0 | Disperser | PVA | Present (Urethane Bond) |
| Example 31 | Sulfate-Esterified | Water and EG (50:50) | 50:50:0 | Disperser | PU | Present (Urethane Bond) |

DMF: N,N-Dimethylformamide
EG: Ethylene Glycol
EtOH: Ethanol
FA: Formamide
PU: Polyurethane
PVA: Polyvinyl Alcohol

TABLE 2

| | CNF Type | Layer Configuration | Cross-Linkage | Liquid Content in Lower Layer When Forming Upper Layer [Mass %] |
|---|---|---|---|---|
| Example 32 | Sulfate-Esterified | CNF/CNC | None | 20 |
| Example 33 | Sulfate-Esterified | CNF/CNC/CNF | None | 20 |
| Example 34 | Sulfate-Esterified | CNC/CNF/CNC | None | 20 |
| Example 35 | Sulfate-Esterified | CNF + Silica (Mass Ratio 100:0.05)/ CNC + Silica (Mass Ratio 100:0.05) | None | 20 |
| Example 36 | Sulfate-Esterified | CNF + Silica (Mass Ratio 100:0.1)/ CNC + Silica (Mass Ratio 100:0.1) | None | 20 |

TABLE 2-continued

| | CNF Type | Layer Configuration | Cross-Linkage | Liquid Content in Lower Layer When Forming Upper Layer [Mass %] |
|---|---|---|---|---|
| Example 37 | Sulfate-Esterified | CNF + Silica (Mass Ratio 100:2.5)/ CNC + Silica (Mass Ratio 100:2.5) | None | 20 |
| Example 38 | Sulfate-Esterified | CNF + Silica (Mass Ratio 100:5)/ CNC + Silica (Mass Ratio 100:5) | None | 20 |
| Example 39 | Sulfate-Esterified | CNF + Silica (Mass Ratio 100:6)/ CNC + Silica (Mass Ratio 100:6) | None | 20 |
| Example 40 | Sulfate-Esterified | CNF + Silica (Mass Ratio 100:0.1)/ CNC | None | 20 |
| Example 41 | Sulfate-Esterified | CNF/ CNC + Silica (Mass Ratio 100:0.1) | None | 20 |
| Example 42 | Sulfate-Esterified | CNF + PVA/ CNC | None | 20 |
| Example 43 | Sulfate-Esterified | CNF/ CNC + PVA | None | 20 |
| Example 44 | Sulfate-Esterified | CNF + PVA/ CNC + PVA | None | 20 |
| Example 45 | Sulfate-Esterified | CNF + PVA/ CNC + PVA | Present (Acetal Bond) | 20 |
| Example 46 | Sulfate-Esterified | CNF + PVA/ CNC + PVA | Present (Urethane Bond) | 20 |
| Example 47 | Sulfate-Esterified | CNF/CNC | None | 5 |
| Example 48 | Sulfate-Esterified | CNF/CNC | None | 0 |
| Example 49 | Sulfate-Esterified | Filter Paper/ CNF + CNC (Mass Ratio 50:50) | None | 20 |
| Example 50 | Sulfate-Esterified | Cardboard/ CNF + CNC (Mass Ratio 50:50) | None | 20 |
| Example 51 | Sulfate-Esterified | Filter Paper/CNF/CNC | None | 20 |
| Example 52 | Sulfate-Esterified | Cardboard/CNF/CNC | None | 20 |

PVA: Polyvinyl Alcohol (3) Evaluation of Redispersibility of Dispersion after Drying Initial viscosities of the dispersions of Examples 1 to 24 and Comparative Examples 1, 2 were measured three times with a B-type viscometer ("TVB10" manufactured by Toki Sangyo Co., Ltd.), and their averages were obtained.

Subsequently, the respective dispersions of Examples 1 to 7, 18 to 24 and Comparative Examples 1, 2, 100 g for each, were frozen at −18° C., and dried with a freeze dryer ("FDU1110" manufactured by TOKYO RIKAKIKAI CO., LTD.). The respective dispersions of Examples 8 to 17 were treated at 10,000 G for five minutes with a centrifugal separator ("Heraeus Megafuge 8R centrifuge" manufactured by Thermo Fisher Scientific K.K.), supernatants were removed, and distilled water was added. This operation was repeated to replace the dispersion media to water. Then, the dispersions, 100 g for each, were frozen at −18° C., and dried with a freeze dryer ("FDU1110" manufactured by TOKYO RIKAKIKAI CO., LTD.) to obtain dried bodies.

A dispersion medium was added to the respective dried bodies to have the same compositions as those whose initial viscosities were measured, and then treated for two minutes with a disperser (Homodisperser Model 2.5 manufactured by Primix), thereby obtaining dispersions. Viscosities of the obtained dispersions were measured three times with a B-type viscometer ("TVB10" manufactured by Toki Sangyo Co., Ltd), and their averages were obtained.

Rates of the viscosity change after drying and redispersing were calculated, and redispersibilities of the respective dispersions of Examples 1 to 20 and Comparative Examples 1, 2 after drying were evaluated based on the following criterion. Table 3 indicates the result.

Good: the rate of viscosity change after drying and redispersing is less than 10%

Fair: the rate of viscosity change after drying and redispersing is 10% or more and less than 30%

Poor: the rate of viscosity change after drying and redispersing is 30% or more (4) Evaluation of Pot Life of Dispersion Initial viscosities of the dispersions of Examples 1 to 24 and Comparative Examples 1, 2 were measured three times with a B-type viscometer ("TVB10" manufactured by Toki Sangyo Co., Ltd.), and their averages were obtained. The respective dispersions were stored at room temperature, and the viscosities of the dispersions were measured three times with the B-type viscometer ("TVB10" manufactured by Toki Sangyo Co., Ltd.) every one month, and their averages were obtained.

Rates of the viscosity change of the dispersions after the storage were obtained, and pot lives of the respective dispersions of Examples 1 to 24 and Comparative Examples 1, 2 were evaluated based on the following criterion. Table 3 indicates the result.

Good: the rate of viscosity change after three months is less than 10%

Fair: the rate of viscosity change after two months is less than 10% and the rate of viscosity change after three months is more than 10%

Poor: the rate of viscosity change after two months is more than 10%

(5) Evaluation of Rupture Strength of Composite

Rupture strengths of the dumbbell-shaped composites of Examples 1 to 52 and Comparative Examples 1, 2 were measured three times according to Japanese Industrial Standard (JIS) C2151 and ASTM D882 with a Tensilon universal material testing machine ("RTF-2410" manufactured by A&D Company, Limited), and their averages were obtained. In the rupture strength measurement, the grip interval was 50 mm, and the tension speed was 200 mm/minute.

The rupture strengths of the composites of Examples 1 to 52 and Comparative Examples 1, 2 were evaluated based on the following criterion. Table 3 indicates the result.

Excellent: the rupture strength is 140 MPa or more

Good: the rupture strength is 120 MPa or more and less than 140 MPa

Fair: the rupture strength is 100 MPa or more and less than 120 MPa

Poor: the rupture strength is less than 100 MPa (6) Evaluation of Oxygen Gas Barrier Property of Composite Oxygen gas permeation rates of the composites of Examples 1 to 52 and Comparative Examples 1, 2 were measured three times under conditions of the temperature of 23° C. and the humidity of 50% according to JIS K7126-2 (temperature and humidity condition: 23° C., 50%) with an oxygen gas permeability meter ("OX-TRAN 2/22" manufactured by MOCON), and their averages were obtained.

The oxygen gas barrier properties of the composites of Examples 1 to 52 and Comparative Examples 1, 2 were evaluated based on the following criterion. Table 3 indicates the result.

Excellent: the oxygen gas permeation rate is less than 0.5 $ml/m^2/day/atm$

Good: the oxygen gas permeation rate is 0.5 $ml/m^2/day/atm$ or more and less than 2.5 $ml/m^2/day/atm$ Fair: the oxygen gas permeation rate is 2.5 $ml/m^2/day/atm$ or more and less than 4.5 $ml/m^2/day/atm$ Poor: the oxygen gas permeation rate is 4.5 $ml/m^2/day/atm$ or more (7) Evaluation of Adhesiveness of Composite The composites of Examples 32 to 52 were cut into the size of 5 cm×5 cm, attached to smooth acrylic boards with an adhesive double coated tape ("NICETACK" manufactured by Nichiban Co., Ltd.), and cured for one hour. Subsequently, a cross-cut test was performed according to JIS K5600-5-6. Specifically, the composite was cut at intervals of 2 mm with a cutter knife, thus forming a grid of 10×10. A cellophane tape was attached to the composite, and an end of the cellophane tape was held and quickly pulled in a direction of 45° to remove the cellophane tape. The surface of the composite was visually observed, and the presence/absence of film delamination from the lower layer or the substrate was determined.

The adhesiveness of the composites of Examples 32 to 52 were evaluated based on the following criterion. Table 3 indicates the result.

Excellent: the number of cells in which film delamination was observed is less than three Good: the number of cells in which film delamination was observed is three or more and less than seven Fair: the number of cells in which film delamination was observed is seven or more and less than eleven Poor: the number of cells in which film delamination was observed is eleven or more

TABLE 3

| | Redispersibility after Drying | Pot Life | Rupture Strength | Gas Barrier Property | Adhesiveness |
|---|---|---|---|---|---|
| Example 1 | Good | Good | Good | Good | — |
| Example 2 | Good | Good | Fair | Fair | — |
| Example 3 | Good | Good | Good | Good | — |
| Example 4 | Good | Good | Good | Good | — |
| Example 5 | Good | Good | Good | Good | — |
| Example 6 | Good | Good | Good | Good | — |
| Example 7 | Good | Good | Fair | Fair | — |
| Example 8 | Good | Good | Good | Good | — |
| Example 9 | Good | Good | Good | Good | — |
| Example 10 | Good | Good | Good | Good | — |
| Example 11 | Good | Fair | Good | Good | — |
| Example 12 | Good | Good | Good | Good | — |
| Example 13 | Good | Fair | Good | Good | — |
| Example 14 | Good | Good | Good | Good | — |
| Example 15 | Good | Good | Good | Good | — |
| Example 16 | Good | Good | Good | Good | — |
| Example 17 | Good | Good | Good | Good | — |
| Example 18 | Good | Good | Good | Good | — |
| Example 19 | Good | Good | Excellent | Good | — |
| Example 20 | Good | Good | Excellent | Good | — |
| Example 21 | Good | Good | Excellent | Good | — |
| Example 22 | Good | Good | Good | Good | — |
| Example 23 | Good | Good | Good | Good | — |
| Example 24 | Good | Good | Fair | Fair | — |
| Comparative Example 1 | Poor | Poor | Poor | Poor | — |
| Comparative Example 2 | Poor | Poor | Poor | Poor | — |
| Example 25 | — | — | Excellent | Good | — |
| Example 26 | — | — | Excellent | Good | — |
| Example 27 | — | — | Excellent | Good | — |
| Example 28 | — | — | Excellent | Good | — |
| Example 29 | — | — | Excellent | Excellent | — |
| Example 30 | — | — | Excellent | Excellent | — |
| Example 31 | — | — | Excellent | Excellent | — |
| Example 32 | — | — | Good | Good | Good |
| Example 33 | — | — | Good | Good | Good |
| Example 34 | — | — | Good | Good | Good |
| Example 35 | — | — | Good | Good | Good |
| Example 36 | — | — | Excellent | Good | Excellent |
| Example 37 | — | — | Excellent | Good | Excellent |
| Example 38 | — | — | Excellent | Good | Excellent |
| Example 39 | — | — | Good | Good | Good |
| Example 40 | — | — | Excellent | Good | Excellent |
| Example 41 | — | — | Excellent | Good | Excellent |
| Example 42 | — | — | Excellent | Good | Good |
| Example 43 | — | — | Excellent | Good | Good |
| Example 44 | — | — | Excellent | Good | Good |
| Example 45 | — | — | Excellent | Good | Good |
| Example 46 | — | — | Excellent | Excellent | Good |
| Example 47 | — | — | Good | Good | Good |
| Example 48 | — | — | Good | Fair | Fair |
| Example 49 | — | — | Good | Good | Good |
| Example 50 | — | — | Good | Good | Good |
| Example 51 | — | — | Good | Good | Good |
| Example 52 | — | — | Good | Good | Good |

The dispersions of Examples 1 to 24 exhibited 1 to 24 exhibited the more satisfactory redispersibility after drying and the longer pot life than those of the dispersions of Comparative Examples 1 and 2. The composites of Examples 1 to 48 exhibited the higher rupture strength and the higher oxygen gas barrier property than those of the composites of Comparative Examples 1 and 2. This indicates that the combination of the sulfate-esterified CNF and the sulfate-esterified CNC provides the satisfactory redispersibility after drying, the long pot life, the high rupture strength, and the high oxygen gas barrier property.

The evaluation result of the composites of Examples 1 to 7 indicated that the mass ratio of the sulfate-esterified CNF to the sulfate-esterified CNC in a range of 1:99 to 99:1 provides the higher rupture strength and the higher oxygen gas barrier property.

The evaluation result of the dispersions of Examples 1 and 8 to 17 indicated that the dispersion medium containing a liquid having a relative permittivity of 38 or more (such as water, DMF, ethylene glycol, and formamide) in an amount of 80 to 100 volume % based on the total volume of the dispersion medium provides the longer pot life.

The evaluation result of the composites of Examples 1 and 18 to 22 indicated that the composite containing inorganic particles, such as silica, in an amount of 0.09 to 5 mass % based on the total mass of the composite provide the higher rupture strength.

The evaluation result of the composites of Examples 1, 23, and 24 indicated that the preparation of the dispersion by applying the shear force with the means such as a disperser and a microfluidizer allows the composite with the higher rupture strength and the higher oxygen gas barrier property to be produced.

The evaluation result of the composites of Examples 1, 9, and 25 to 31 indicated that the addition of a resin, such as polyurethane and PVA, or a rubber, such as a natural rubber, improves the rupture strength of the composite. Additionally, it is indicated that the composite may have a cross-linked structure, and especially, a cross-linkage via a urethane bond improves the oxygen gas barrier property of the composite.

The composites including a plurality of stacked layers of Examples 32 to 48 also exhibited the high rupture strength and the high oxygen gas barrier property.

The evaluation result of the composites of Examples 32 and 35 to 41 indicated that when at least one layer of the plurality of layers of the composite contains inorganic particles in an amount of 0.09 to 5 mass % based on the total mass of the layer, the higher rupture strength is achieved, and the adhesiveness between the layers is improved.

The evaluation result of the composites of Examples 32 and 42 to 46 indicated that adding a resin or a rubber improves the rupture strength of the composite. Additionally, it is also indicated that the composite may have a crosslinked structure, and especially, a cross-linkage via a urethane bond improves the oxygen gas barrier property of the composite.

The evaluation result of the composites of Examples 32, 47, and 48 indicated that, in the production of the composite including the stacked upper layer and lower layer, supplying a dispersion for forming the upper layer over the lower layer containing a liquid (especially, a lower layer containing a liquid in an amount of more than 0 mass % and less than or equal to 30 mass %, or more than 5 mass % and less than or equal to 25 mass %) and subsequently removing the liquids from the upper layer and the lower layer allow improvement in the adhesiveness between the upper layer and the lower layer as compared with a case in which the upper layer is formed after the liquid in the lower layer is completely removed.

The evaluation result of the composites of Examples 49 to 52 indicated that the composite including the paper substrate derived from biomass, such as a filter paper and a cardboard, and the CNC and the CNF supported on the paper substrate has the high rupture strength, the high gas barrier property, and the high adhesiveness.

All the publications, patents, and patent applications cited in Description are directly incorporated herein as references.

The invention claimed is:

1. A method for preparing a dispersion, the dispersion comprising:

a cellulose nanofiber having a sulfate ester group; and a cellulose nanocrystal having a sulfate ester group, the method comprising:

mixing a solution containing dimethylsulfoxide, sulfuric acid, and at least one of acetic anhydride or propionic acid anhydride with a raw pulp to obtain a sulfate-esterified pulp, and fibrillating the sulfate-esterified pulp to prepare a dispersion of the cellulose nanofiber having the sulfate ester group; and mixing the dispersion of the cellulose nanofiber having the sulfate ester group with a dispersion of a cellulose nanocrystal having a sulfate ester group while applying a shear force.

2. The method according to claim 1, wherein the dispersion further comprises a dispersion medium, the dispersion medium containing a liquid having a relative permittivity of 38 or more in an amount of 75% to 100% by volume based on a total volume of the dispersion medium.

* * * * *